United States Patent
Picco

(10) Patent No.: US 9,173,267 B2
(45) Date of Patent: *Oct. 27, 2015

(54) MODULAR CENTRALIZED LIGHTING CONTROL SYSTEM FOR BUILDINGS

(76) Inventor: Michael L. Picco, Fort Wayne, IN (US)

( * ) Notice: Subject to any disclaimer, the term of this patent is extended or adjusted under 35 U.S.C. 154(b) by 1168 days.

This patent is subject to a terminal disclaimer.

(21) Appl. No.: 13/065,140

(22) Filed: Mar. 15, 2011

(65) Prior Publication Data

US 2011/0245938 A1 Oct. 6, 2011

Related U.S. Application Data

(60) Provisional application No. 61/341,576, filed on Apr. 1, 2010.

(51) Int. Cl.
| | |
|---|---|
| G05B 11/01 | (2006.01) |
| H05B 33/08 | (2006.01) |
| H05B 37/02 | (2006.01) |
| H04L 12/28 | (2006.01) |

(52) U.S. Cl.
CPC ........ H05B 33/0863 (2013.01); H05B 37/0254 (2013.01); *H04L 12/282* (2013.01); *Y02B 20/48* (2013.01)

(58) Field of Classification Search
CPC ........ H04L 1/0004; G05B 1/01; G05B 13/00; G05B 13/024; H05B 37/0218; H05B 37/0254
USPC ........ 700/19, 28, 83, 276, 277, 278, 299, 302
See application file for complete search history.

(56) References Cited

U.S. PATENT DOCUMENTS

| | | |
|---|---|---|
| 4,095,139 A | 6/1978 | Symonds et al. |
| 4,200,862 A | 4/1980 | Campbell et al. |
| 4,388,567 A | 6/1983 | Yamazaki et al. |

(Continued)

*Primary Examiner* — Mohammad Ali
*Assistant Examiner* — Sheela S Rao
(74) *Attorney, Agent, or Firm* — Jacque R. Wilson; Carson Boxberger LLP

(57) ABSTRACT

A lighting control system for controlling lights of buildings includes a computer server communicating with programmable master interfaces through an Ethernet communication link. The server is programmed to establish control commands responsive to environment status information. The master interfaces communicate through a primary communication link with programmable input devices which include input interfaces and smart switches, and with programmable output devices. The output devices communicate with a master interface through its primary communication link and also communicate with programmable relay/dimmer devices through a secondary communication link. The relay/dimmer devices control building lights responsive to control commands. The input interfaces communicate with a master interface through its primary communication link and also communicate with ambient light/occupancy sensor devices through a secondary communication link. The ambient light/occupancy sensor devices monitor building zones and establish environment status information. The smart switches include a touch screen LCD used by building occupants for also establishing environment status information. The environment status information and control commands are communicated through the interfaces for thereby controlling the building lights. Each of the interfaces and devices are identified with a unique ID established and maintained by the server. Each unique ID is linked to a virtual graphical representation by the server and displayed on a monitor.

20 Claims, 25 Drawing Sheets

(56) References Cited

U.S. PATENT DOCUMENTS

| | | | |
|---|---|---|---|
| 4,418,333 A | 11/1983 | Schwarzbach et al. |
| 4,438,506 A | 3/1984 | Strom |
| 4,716,344 A | 12/1987 | Newell et al. |
| 4,837,665 A | 6/1989 | Hoyer et al. |
| 5,059,871 A | 10/1991 | Pearlman et al. |
| 5,128,855 A | 7/1992 | Hilber et al. |
| 5,209,560 A | 5/1993 | Taylor et al. |
| 5,463,286 A | 10/1995 | D'Aleo et al. |
| 5,481,750 A | 1/1996 | Parise et al. |
| 5,565,855 A | 10/1996 | Knibbe |
| 5,726,644 A | 3/1998 | Jednacz et al. |
| 5,962,992 A | 10/1999 | Huang et al. |
| 6,118,230 A | 9/2000 | Fleischmann |
| 6,175,201 B1 | 1/2001 | Sid |
| 6,459,938 B1 | 10/2002 | Ito et al. |
| 6,608,453 B2 | 8/2003 | Morgan et al. |
| 6,807,516 B2 | 10/2004 | Williams et al. |
| 6,813,525 B2 | 11/2004 | Reid et al. |
| 7,085,627 B2 | 8/2006 | Bamberger et al. |
| 7,253,566 B2 | 8/2007 | Lys et al. |
| 7,307,542 B1 | 12/2007 | Chandler et al. |
| 7,333,903 B2 | 2/2008 | Walters et al. |
| 7,369,060 B2 | 5/2008 | Veskovic et al. |
| 7,429,982 B2 | 9/2008 | You et al. |
| 7,566,137 B2 | 7/2009 | Veskovic |
| 7,566,987 B2 | 7/2009 | Black et al. |
| 8,214,061 B2 * | 7/2012 | Westrick et al. ............ 700/9 |
| 2002/0016639 A1 | 2/2002 | Smith et al. |
| 2002/0175642 A1 | 11/2002 | von Kannewurff et al. |
| 2006/0161270 A1 * | 7/2006 | Luskin et al. ............ 700/22 |
| 2006/0271204 A1 * | 11/2006 | Hesse et al. ............ 700/2 |
| 2008/0092075 A1 | 4/2008 | Jacob et al. |

* cited by examiner

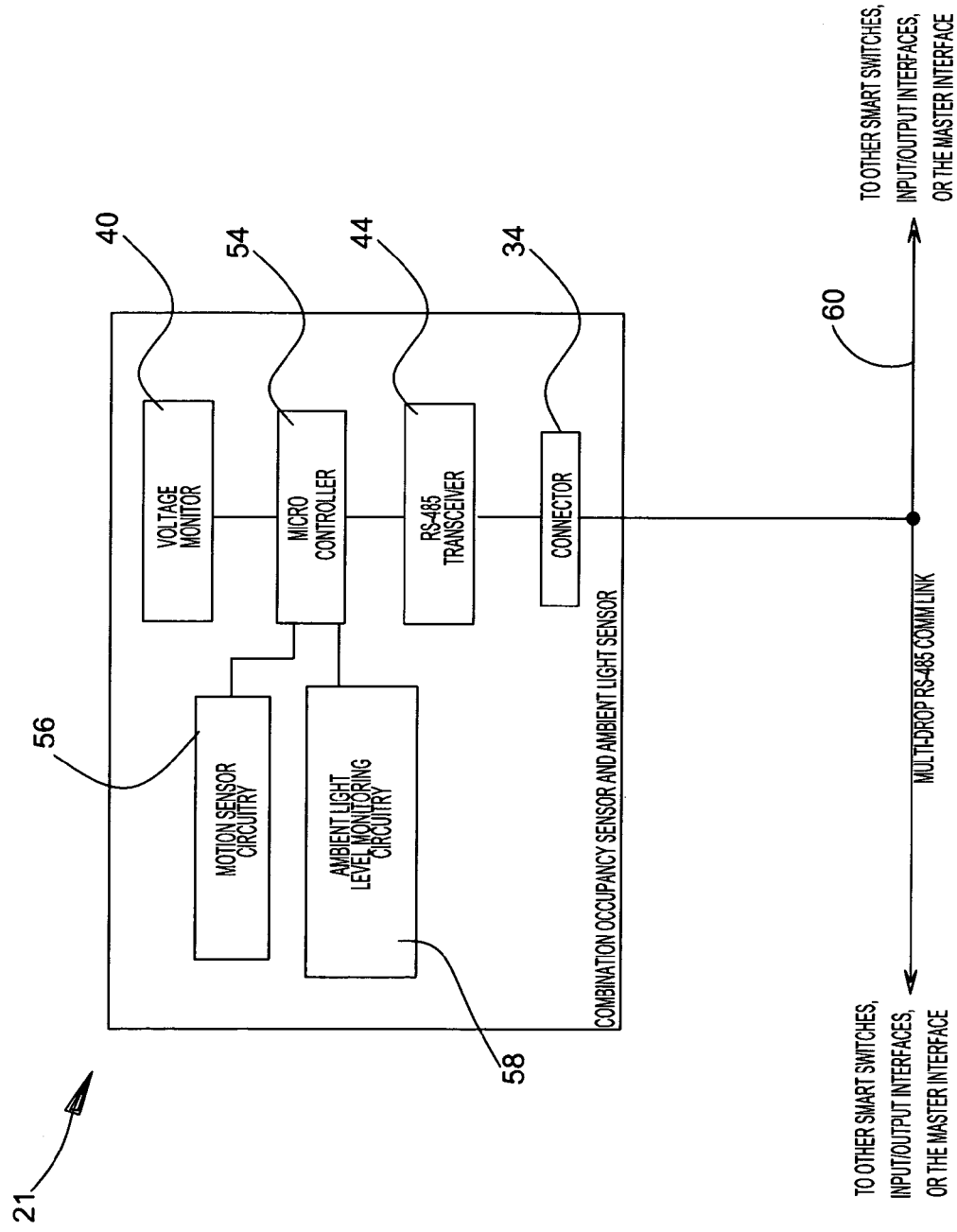

EX. #1 - CHANGE OCC SENSOR'S
DELAY TIME

STEP A1: USER ENTERS A NEW DELAY TIME AT THE LIGHTING CONTROL SERVER (OR ANOTHER COMPUTER THAT IS REMOTED INTO THE SERVER).

STEP A2: DATABASE IS UPDATED AT THE SERVER.

STEP A3: REVISION IS SENT TO THE MASTER INTERFACE THAT IS IN CONTROL OF THE OCC SENSOR FOR WHICH THE DELAY TIME IS TO BE CHANGED.

STEP A4: THE MASTER RECEIVES THE CHANGES AND FORWARDS THE CHANGES TO THE APPROPRIATE INPUT INTERFACE.

STEP A5: THE INPUT INTERFACE FORWARDS THE CHANGE TO ALL OF THE APPLICABLE OCC SENSORS THAT IT IS IN CONTROL OF.

STEP A6: EACH SENSOR UPDATES ITS DELAY TIME AND THEN RESPONDS BACK TO THE CONTROLLING INPUT INTERFACE THAT THE CHANGE WAS MADE.

STEP A7: IF A SENSOR DID NOT RESPOND WITH A CONFIRMING MESSAGE BACK TO THE INPUT INTERFACE THEN THE ERROR MESSAGE IS DISPLAYED ON ITS LCD DISPLAY AND THAT ERROR IS SENT BACK TO THE SERVER FOR LOGGING.

EX. #2 - OCC SENSOR RECOGNIZES
MOTION IN ITS VIEWING AREA

STEP B1: THE MOTION SENSOR RECOGNIZES MOTION IN ITS VIEWING AREA IMMEDIATELY IT SENDS A LIGHTS "ON" COMMAND TO ITS CONTROLLING INPUT INTERFACE. ADDITIONALLY IT STARTS A DELAY TIMER (BASED ON A VALUE IT HAS SAVED FROM THE SERVER).

STEP B2: THE INPUT INTERFACE RECEIVES THE MESSAGE RECORDS THE "STATE CONDITION" AND FORWARDS THE REQUEST TO ITS MASTER INTER.

STEP B3: THE MASTER INTERFACE RECEIVES THE REQUEST FROM THE INPUT INTERFACE AND LIKEWISE FORWARDS THE REQUEST ON TO THE SERVER THROUGH THE ETHERNET NETWORK.

STEP B4: THE SERVER QUERIES ITS DATABASE FOR WHAT RESPONSE IS NECESSARY FROM THE REQUEST (I.E. WHAT RELAY IT TO BE TURNED ON).

STEP B5: THAT RESPONSE IS SENT BACK OUT THROUGH THE ETHERNET NEWTORK TO THE MASTER INTERFACE(S) THAT IS IN CONTROL OF THE OUTPUT INTERFACE(S) THAT IS IN CONTROL OF THE RELAY(S).

STEP B6: THE MASTER INTERFACE(S) FORWARDS THE COMMAND ON TO THE OUTPUT INTERFACE(S) THAT CONTROL THE RELAY(S).

STEP B7: THE OUPUT INTERFACE(S) RECORD THE "STATE CONDITION" AND FORWARD THAT COMMAND ON TO THE RELAY(S).

STEP B8: THE RELAY RECEIVES THE "ON COMMAND" AND THEN TURNS ON ITS RELAY.

STEP B9: IF A RELAY DID NOT RESPOND WITH A CONFIRMING MESSAGE THEN THE ERROR MESSAGE IS DISPLAYED ON THE OUTPUT INTERFACE'S LCD DISPLAY AND THAT ERROR IS SENT BACK TO THE SERVER FOR LOGGING.

Fig 11b.

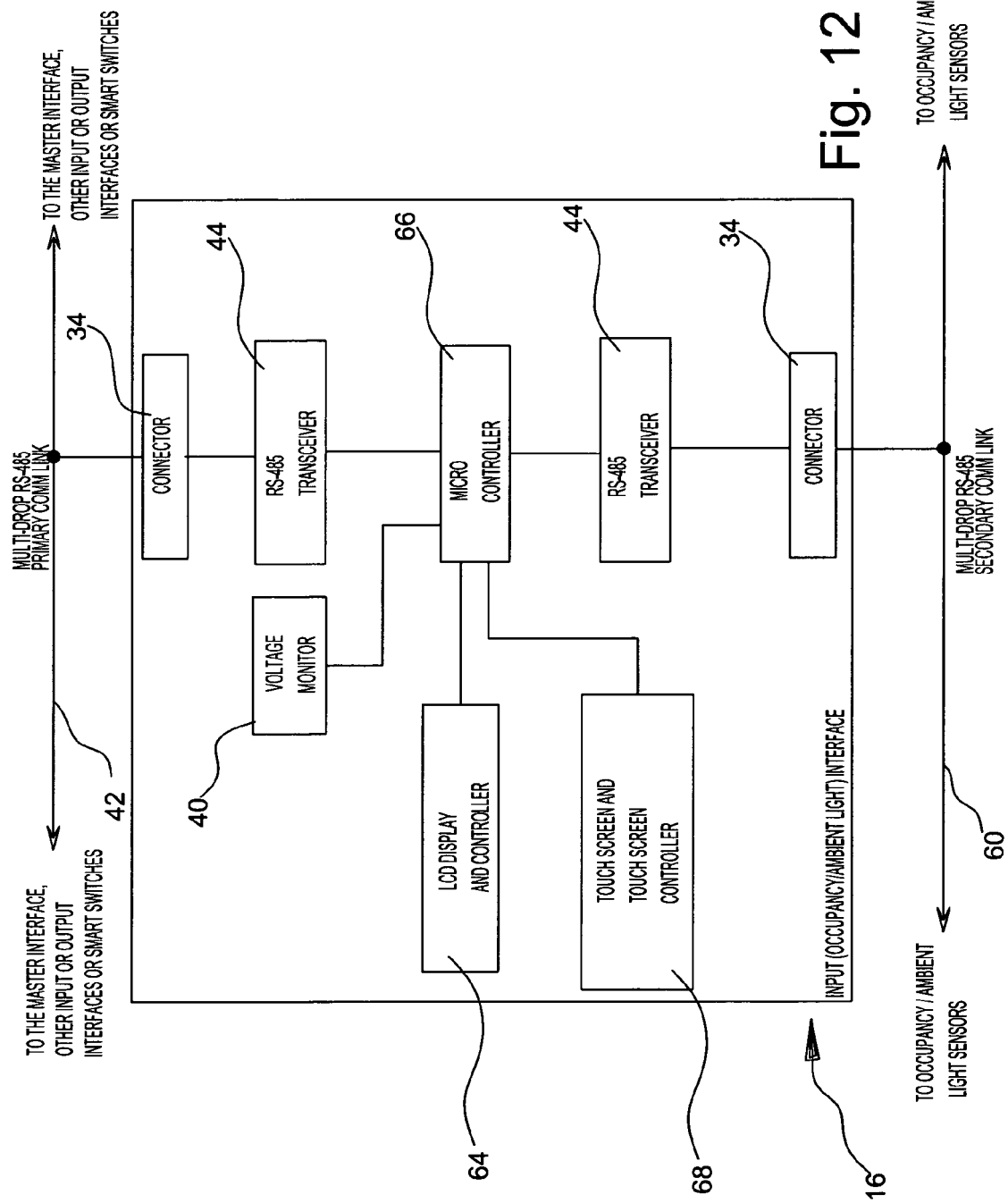

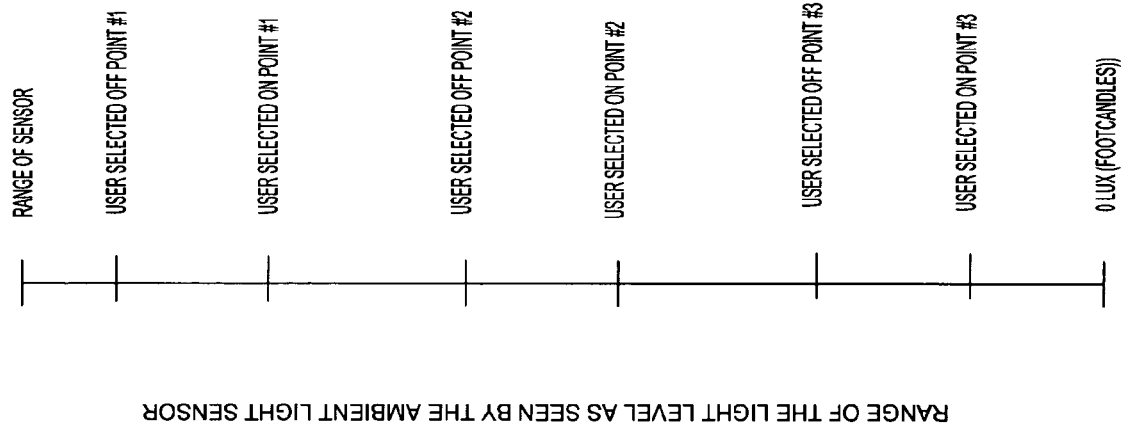

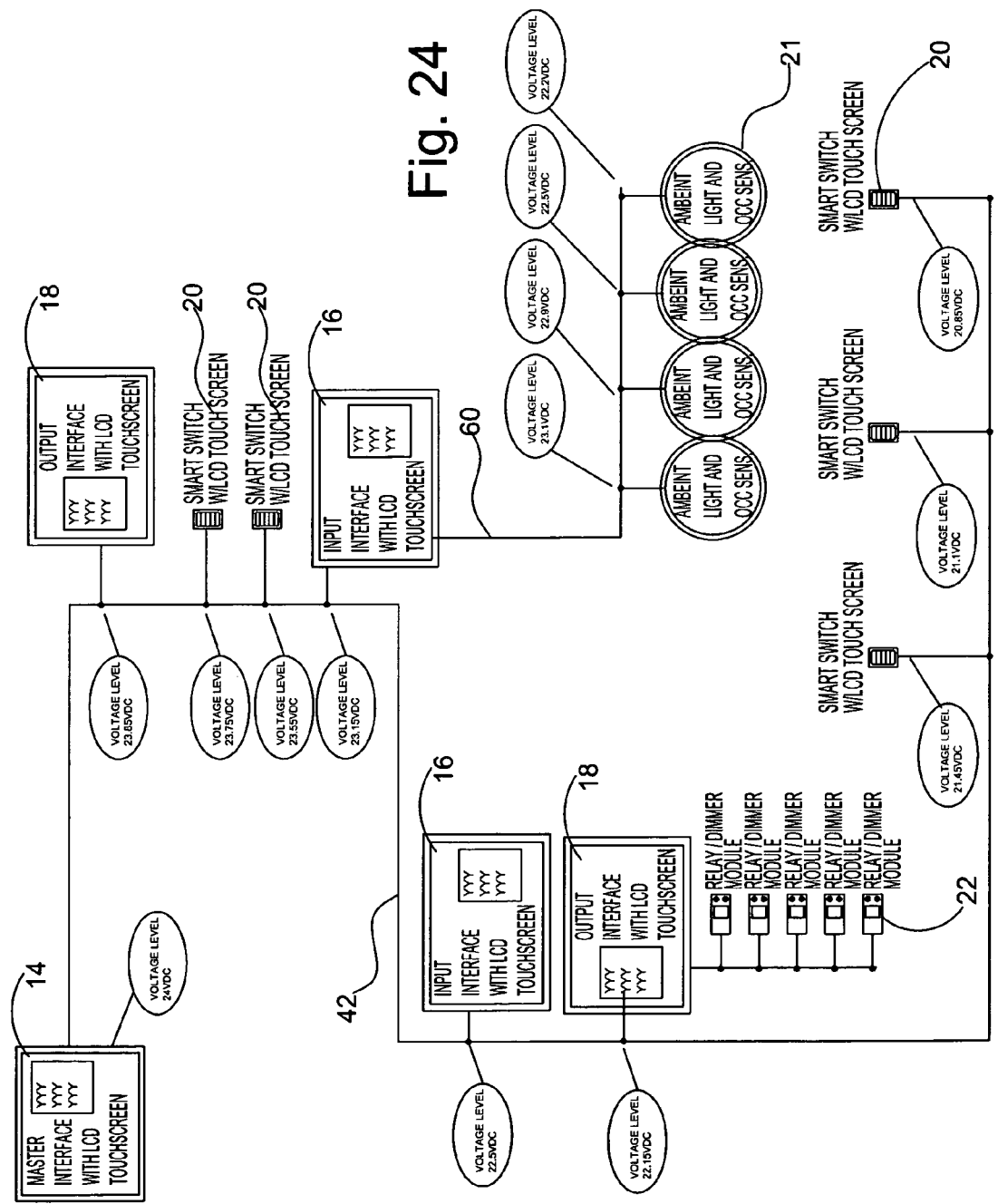

MODULAR CENTRALIZED LIGHTING CONTROL SYSTEM FOR BUILDINGS

CROSS REFERENCE TO RELATED APPLICATIONS

This application claims priority under 35 U.S.C. 119(e) of U.S. provisional patent application Ser. No. 61/341,576 filed on Apr. 1, 2010 entitled AUTOMATIC ADDRESSING AND SELF CALIBRATING LIGHTING CONTROL SYSTEM the disclosure of which is hereby incorporated herein by reference.

BACKGROUND OF THE INVENTION

1. Field of the Invention

The present invention relates to the field of lighting control systems typically used in buildings. More particularly, the present invention relates to the field of centralized building lighting control systems for managing, controlling and maintaining lighting within and around a building.

2. Description of Related Art

Centralized building lighting control systems have conventionally been configured with a head-end central control panel. Output devices such as relay panels are connected via a multi-wire communication signal line to the head-end central control panel. Input devices such as switches are connected by either the same communication signal line or a separate communication line. FIGS. 1 and 2 depict both of these scenarios. In order to communicate with the head end controller, the input and output devices are addressed locally with either dip switches or selector switches as, for example, depicted in FIG. 3. Each device on the communication signal line must have a unique address. If a device is mistakenly addressed to another device's address it will cause errors on that communication signal line. Consequently, installers must keep track of what addresses have been assigned during the installation of the devices. As can be appreciated, this is a cumbersome and time consuming task.

Centralized lighting control systems have traditionally been controlled by a head-end controller. This controller is typically configured with a central processor that manages all of the devices on the communication signal lines. Because of this arrangement, a limited number of communication lines are able to be connected to the control system, thus limiting the number of input and output devices able to be controlled. Coordination and control of the entire system is accomplished in the head-end controller. Additionally, modifications to the control scheme need to be down loaded from a separate desktop or laptop computer. This computer is connected to the head end controller either directly or through an interface module as, for example, depicted in FIG. 4. This computer is fitted with a software package that is able to modify the central controller's input/output scheme or control sequence (i.e. to program the system). To make these modifications, the user connects the computer to the head end controller with either a serial connection (RS-232) or an Ethernet connection. The user then makes the appropriate modifications on the connected computer utilizing the software package residing on that computer. After the modifications are complete on the connected computer, they are downloaded to the head end controller. The computer is solely used for programming and/or monitoring the head end controller.

The traditional head end based control systems have several limitations including, for example, the following.

Head end control based systems, due to their architecture, have a limited number of inputs (i.e. switches) and outputs (relays). Although large scale control systems exist which are capable of handling a large number of inputs and outputs, those systems are suited for just that purpose—large scale control. They are typically relatively expensive and practically useable only for large scale control systems/applications. The head end control based systems are also typically very expensive and, although capable of controlling a relatively small input/output count system, they are generally cost "in-effective" for both small and large scale applications.

Head end control based systems do not effectively interface with the individual programming the system. Since the "programming" computer is not an integral part of the lighting control system, it requires the user (programmer) to develop the program and down load it to the head-end controller. At first glance, this may appear to be a benefit since the computer is not "required" for the system to function. But after further analysis it quickly becomes evident that it is not a benefit, but rather a hindrance. With the traditional head end based system a computer is still required for download of the program; it is simply not used for direct interaction or control of the system. The user can program, monitor and even manipulate the system but this is done through downloads and uploads from the head end controller that is the means of control for the system. FIG. 5 depicts the flow of communication for typical head end based systems.

It is noted that head end based systems exist that do not require a computer to program them. In this type of setup all of the information is stored and programmed directly on a keypad on the head end controller. These types of systems are worse yet, as they do not have the means to store the program on a separate device (i.e. computer's hard drive). Should the head end controller fail, the program is lost and must be "rebuilt" in a new head end controller.

As depicted in FIG. 3, traditional head-end based systems use a method of addressing devices on the network with dip switches or selector switches. This requires all of the devices connected to the system to be addressed prior to its installation. All devices need to be coordinated such that no two devices on a communication link share the same address. This may not seem like a monumental item at first, but after further examination this can be a daunting task. First of all, devices have to be mapped and coordinated prior to the installation. Devices on different communication links can share the same address with a device on another communication link. If a device is accidentally installed on the wrong communication link, duplication of addresses can exist. Secondly, good records of the system and how it is all connected must be maintained with this type of system. If the system is initially set up and at a later date modifications to the system are made, the records from the first installation must be coordinated with the modification to assure that no duplication of addressing is done on a communication link. However, as a practical matter, records can be lost or inaccurate leading to difficulties when making future modifications.

In head end control based systems, a paper directory card must be maintained and amended at the relay or dimming panels as the controlling loads are added and/or changed. This directory is used to describe what area or lighting circuit is controlled by a given relay or dimmer. Many times this paper card is lost, not maintained and/or contains incorrect entries. When an addition or modification is required, the installer must, therefore, trace out all of the unknown circuits and map out the wiring prior to the modification or addition. Additionally, when a relay or dimmer has failed or is not operating as intended, it can be difficult to rectify the problem without an accurate record of the circuitry. As a consequence, modifications and troubleshooting can be relatively time consuming and costly.

To conserve energy, modern facilities lighting control systems have incorporated occupancy sensors and ambient light level sensors. Occupancy sensors are used to detect motion in a given area. When motion is detected, a digital "on" signal is sent back to the head end controller to turn on a relay or dimmer. The occupancy sensor also starts an internal timer and, when the time cycle is completed, sends a digital "off" signal back to the same head end controller. The timer is continually reset by the motion sensor, thus maintaining the lights on as long as motion is detected. The deficiency with this type of control system is that all of the control settings are at the sensor. Should a different delay/cycle time be desired, it must physically be set at the sensing device/sensor. These devices are typically mounted to the ceiling of the controlled area and, in larger systems, there can be hundreds or thousands of them throughout the facility. Making a change to the delay/cycle time (a task frequently required to "calibrate" the system) can, therefore, take a substantial amount of time and be fairly costly.

The other component used in energy conservation of a lighting control system, the ambient light sensor, is typically a separate device with manual control of the set points. The user simply "picks" an event to occur (on or off of a lighting relay or level of a dimmer) based on the light level in the area. This can be cumbersome as the sensors are not self calibrating to the area of control and require the installer to manually set, and often reset them, until the desired set point is attained. Like the occupancy sensor, all levels of control and setpoints are at the device. Any adjustments and/or setting of the time delay, sensitivity to light, and set points in connection with both time and light must be made manually at the device. Similarly, adjusting, maintaining and repairing these devices can be relatively time consuming and costly.

SUMMARY OF THE INVENTION

The present invention overcomes the disadvantages of prior lighting control systems and provides additional advantages and benefits as described herein below.

In general, the present invention incorporates a new method of control and interface structure for a centralized building lighting control system. It addresses the aforementioned problems of existing systems by, among other things, distributing control to the local devices and coordinating that control at a central computer. The inventive lighting control system is modular, efficient, substantially easier to setup and maintain, and scalable for use in relatively small and large facilities/applications.

In one form thereof, the present invention comprises a lighting control system for controlling lights of buildings. The lighting control system includes a programmable lighting control computer server adapted to interface with a user. The server is programmed to establish desired control commands responsive to environment status information. A master interface is provided including at least one programmable microcontroller connected to and communicating with the server. The environment status information and control commands are communicated between the master interface and the server. The master interface is connected to and adapted to communicate through a primary communication link. An input device including a programmable microcontroller is connected to the primary communication link and is adapted to communicate with the master interface. The input device is capable of monitoring the environment status of a building zone and establishing environment status information, the environment status information being communicated between the master interface and the input device through the primary link. An output device including a programmable microcontroller is connected to the primary communication link and adapted to communicate with the master interface. The output device is capable of controlling a light in the zone in response to a control command, the control command being communicated between the master interface and the output device through the primary link. Accordingly, the building zone environment status information can be communicated from the input device to the master interface and from the master interface to the server; said server can establish a desired control command responsive to the environment status information; and, the control command can be communicated from the server to the master interface and from the master interface to the output device, whereby the light in the zone is controlled responsive to the control command.

In another form thereof the present invention comprises a lighting control system for controlling lights of buildings and includes a programmable lighting control computer server adapted to interface with a user. The server is programmed to establish desired control commands responsive to environment status information. A master interface is provided including at least one programmable microcontroller connected to and communicating with the server. The environment status information and control commands are communicated between the master interface and the server. The master interface is connected to and adapted to communicate through a primary communication link. An input device is provided comprising a smart switch having a programmable microcontroller connected to the primary communication link and adapted to communicate with the master interface. The smart switch has a touch screen LCD connected to and being controlled by the smart switch microcontroller to display touch screen input buttons and button descriptions. The smart switch microcontroller is capable of monitoring the status of the input buttons and establishing environment status information therefrom. The environment status information is communicated between the smart switch and the master interface through the primary link. An output device is provided comprising an output interface having a programmable microcontroller connected to the primary communication link and adapted to communicate with the master interface. Control commands are communicated between the output interface and the master interface through the primary link. The output interface is connected to and adapted to communicate through a secondary communication link. One of a relay or dimmer device having a programmable microcontroller is connected to the secondary communication link and adapted to communicate with the output interface. The one of a relay or dimmer device is capable of controlling a light in the zone in response to a control command. The control command is communicated between the output interface and the one of a relay or dimmer device through the secondary link. Accordingly, the building zone environment status information can be communicated from the input device to the master interface and from the master interface to the server; the server can establish a desired control command responsive to the environment status information; and the control command can be communicated from the server to the master interface and from the master interface to the output device, whereby the light in the zone is controlled responsive to the control command.

In yet another form thereof the present invention comprises a lighting control system for controlling lights of buildings and includes a programmable lighting control computer server adapted to interface with a user. The server is programmed to establish desired control commands responsive to environment status information. A master interface is provided including at least one programmable microcontroller connected to and communicating with the server. The environment status information and control commands are communicated between the master interface and the server. The master interface is connected to and adapted to communicate through a primary communication link. An input device is provided comprising an input interface having a programmable microcontroller connected to the primary communication link and adapted to communicate with the master interface. The environment status information is communicated between the input interface and the master interface through the primary link. The input interface is connected to and adapted to communicate through a secondary communication link. An ambient light and occupancy sensor device having a programmable microcontroller is connected to the secondary communication link and adapted to communicate with the input interface. The sensor device is capable of monitoring the ambient light and motion in the building zone and establishing environment status information therefrom. The environment status information is communicated between the input interface and the sensor device through the secondary link. An output device is provided comprising an output interface having a programmable microcontroller connected to the primary communication link and adapted to communicate with the master interface. Control commands are communicated between the output interface and the master interface through the primary link. The output interface is connected to and adapted to communicate through a secondary communication link. One of a relay or dimmer device having a programmable microcontroller is connected to the secondary communication link and adapted to communicate with the output interface. The one of a relay or dimmer device is capable of controlling a light in the zone in response to a control command. The control command is communicated between the output interface and the one of a relay or dimmer device through the secondary link. Accordingly, the building zone environment status information can be communicated from the input device to the master interface and from the master interface to the server; the server can establish a desired control command responsive to the environment status information; and the control command can be communicated from the server to the master interface and from the master interface to the output device, whereby the light in the zone is controlled responsive to the control command.

Preferably, each of the master interface, input device and said output device are identified in the control system with a unique address. The unique addresses are established and maintained by said server and are communicated between the server and the master interface and between said master interface and the input and output devices through the primary link. The unique addresses are linked to a virtual graphical representation at said server, and the virtual graphical representations are displayed on a monitor connected to the server.

The master interface includes a power source connected to and providing power to each of the input and output devices through the primary link in a daisy chain. Each of the input and output devices include a voltage monitor capable of monitoring the voltage level at the device, and each of said input and output devices monitors its voltage monitor and establishes voltage level information. The voltage level information is communicated between the input devices and the master interfaces through the primary link and between the master interface and the server. The server creates a graphical representation of the location of the input and output devices by using the voltage level information and the unique addresses of the input and output devices.

Yet more preferably, the master interface includes an Ethernet microcontroller and a master microcontroller connected and communicating with each other through a dedicated serial communication link. The Ethernet microcontroller is connected to and communicating with the server through an Ethernet TCP/IP protocol link, and the master microcontroller is connected to and communicating with the input and output devices through the primary communication link. The primary connection and communication between the master interface and the input and output devices is via an RS-485 multi drop addressable protocol link.

The output interface preferably includes a touch screen LCD connected to and being controlled by the output interface microcontroller to display information about the one of a relay or dimmer, touch screen input buttons and button descriptions. The output interface microcontroller is capable of monitoring the status of the input buttons and establishing environment status information therefrom. The environment status information is communicated between the output interface and the master interface through the primary link. The displayed information can include address information associated with said one of a relay or dimmer.

The input interface preferably includes a touch screen LCD connected to and being controlled by the input interface microcontroller to display information about the connected ambient light and occupancy sensor devices, touch screen input buttons and button descriptions. The input interface microcontroller is capable of monitoring the status of the input buttons and establishing environment status information therefrom. The environment status information is communicated between the input interface and the master interface through the primary link. The displayed information can include include address information associated with the ambient light and occupancy sensor device.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 10 is a block diagram of an ambient light/occupancy sensor device constructed and connected to a lighting control system in accordance with the present invention;

FIG. 11(b) are flow diagrams corresponding to the schematic diagram of FIG. 11(a) and illustrating communications between an ambient light/occupancy sensor device and the server;

FIG. 12 is a block diagram of an input interface constructed and connected to a lighting control system in accordance with the present invention;

FIG. 23 is a schematic diagram of a prior art ambient light sensor control method; and, FIG. 24 is a schematic diagram illustrating the voltage drop phenomenon used in the present invention for creating a graphical representation.

Figure 1:
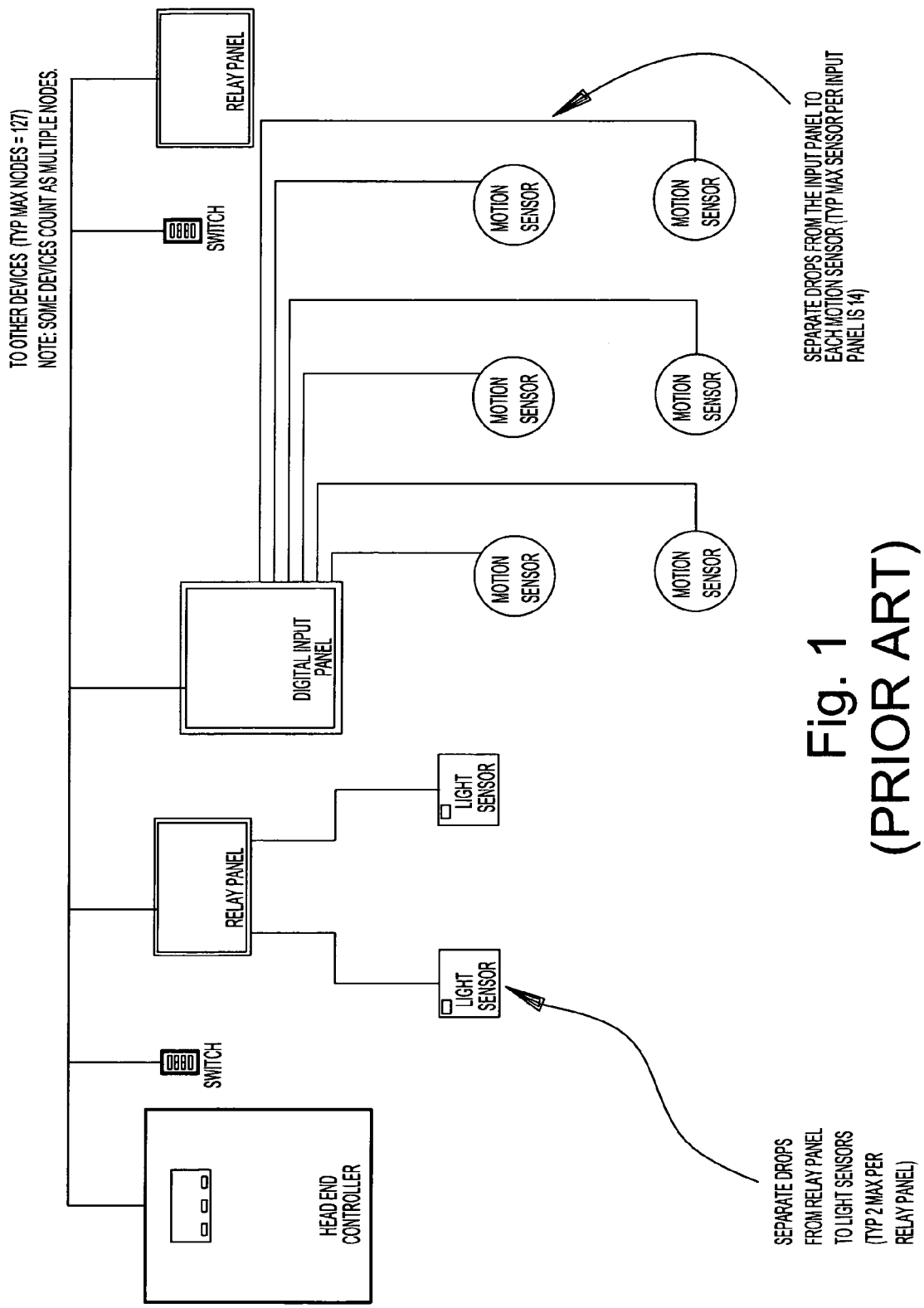
FIG. 1 is a schematic view of a prior art centralized building lighting control system with a head-end central control panel.
Figure 2:
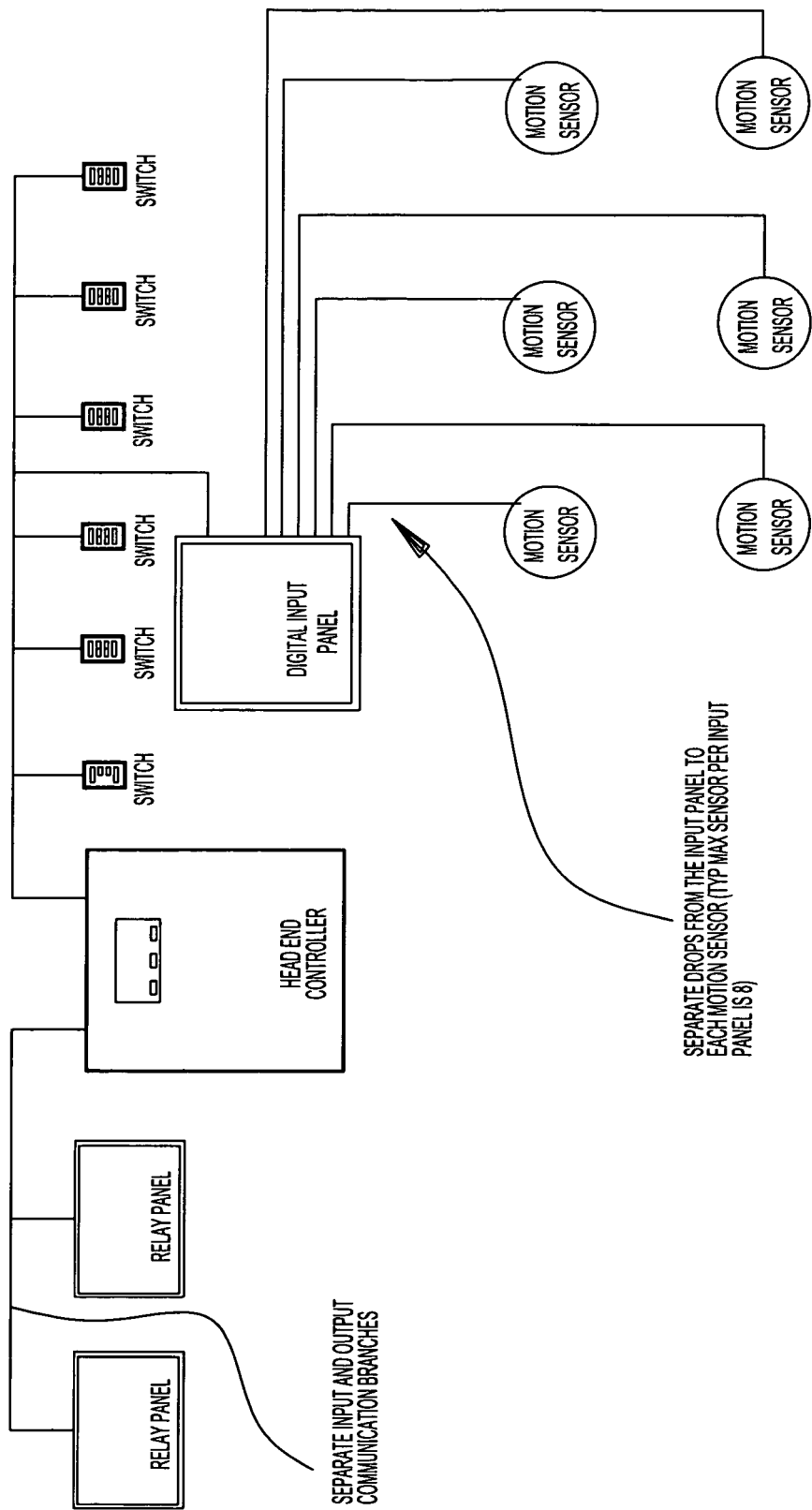
FIG. 2 is a schematic view of another prior art centralized building lighting control system with a head-end central control panel.
Figure 3:
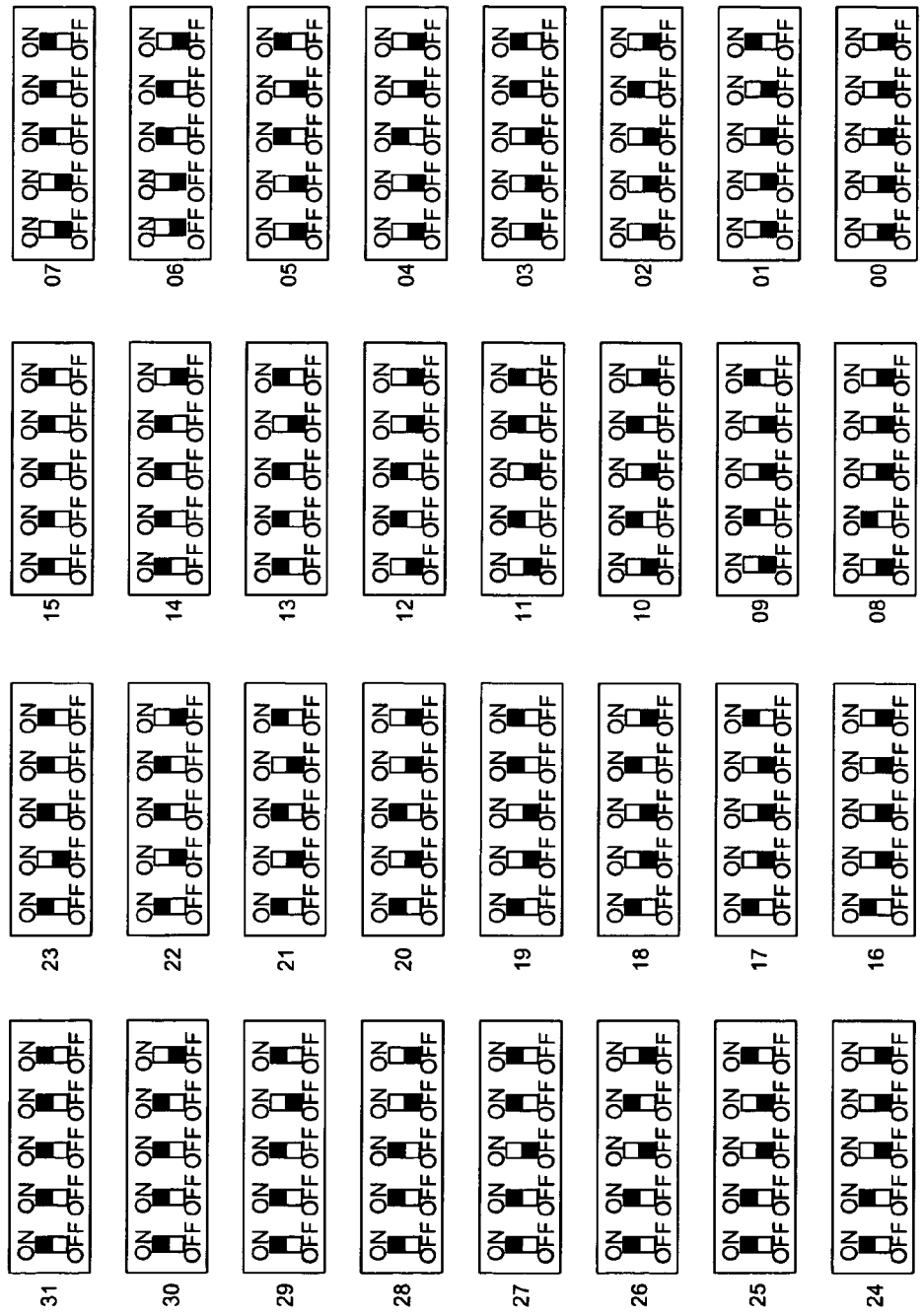
FIG. 3 is an addressing dip switch bank of prior art lighting control systems.
Figure 4:
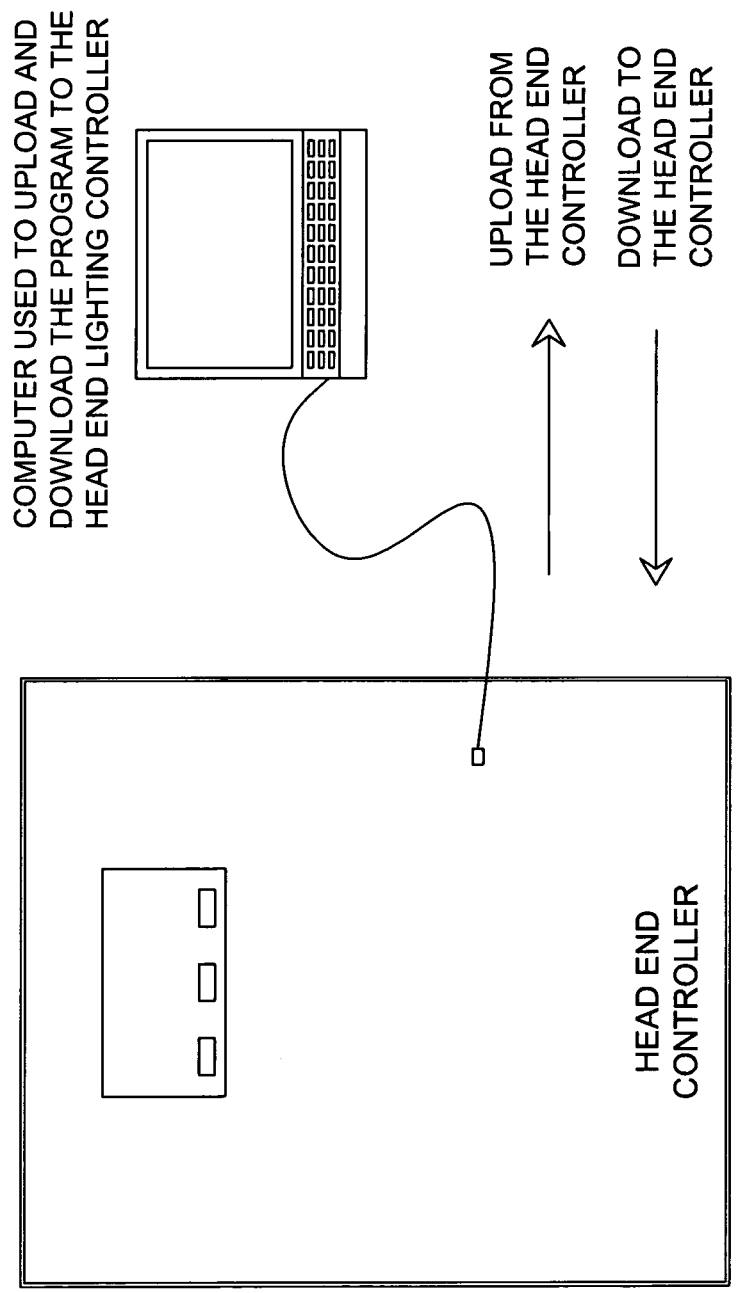
FIG. 4 is a schematic diagram of prior art downloading/uploading communications between the head end controller and a computer.
Figure 5:
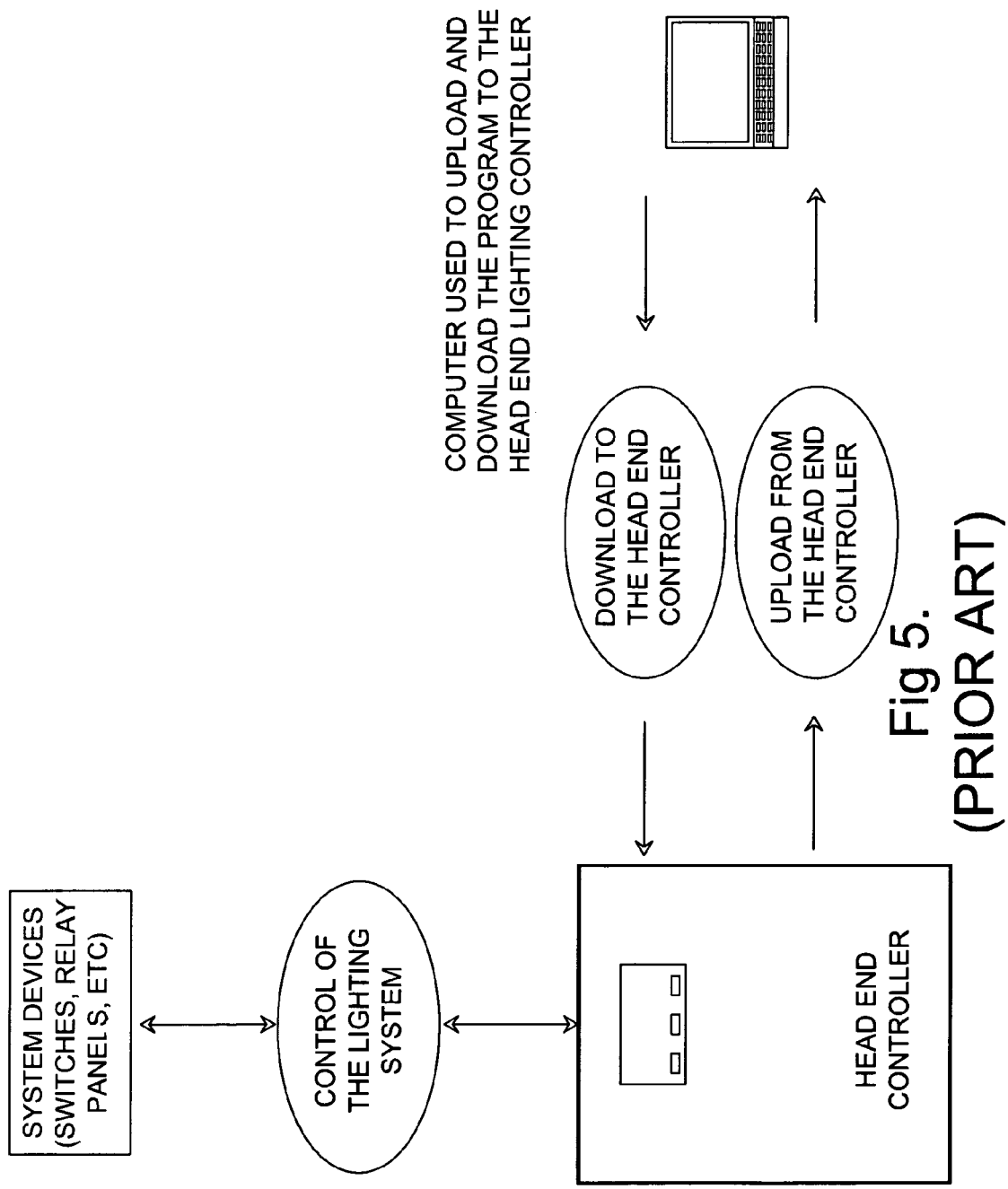
FIG. 5 is a flow diagram of prior art head end lighting control systems.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENT

Figure 6:
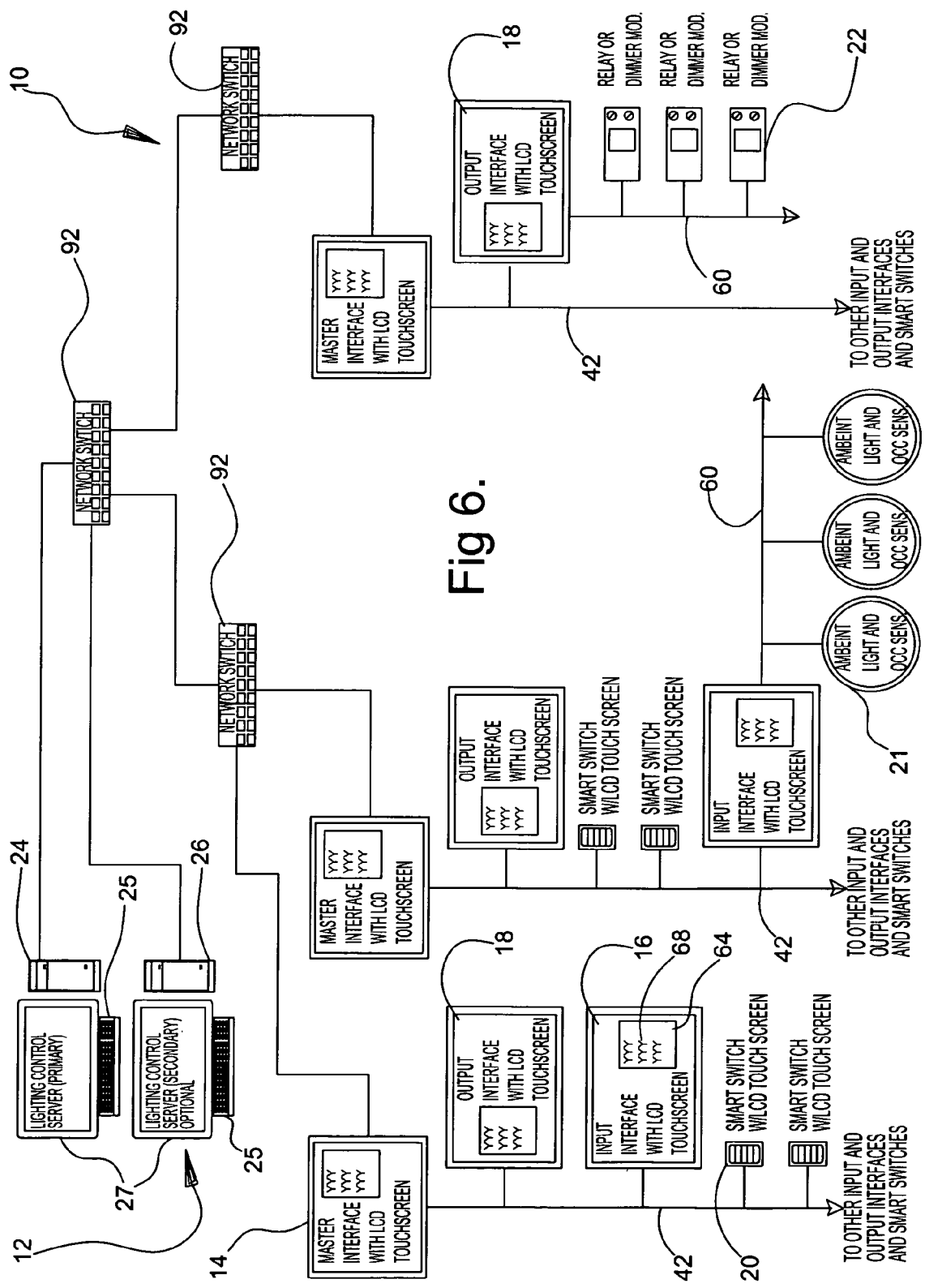
FIG. 6 is a schematic diagram of a lighting control system constructed in accordance with the principles of the present invention.

A centralized building lighting control system constructed in accordance with the principals of the present invention is shown and generally depicted in the drawings with the numeral 10. The structure of a lighting control system 10 is generally shown and depicted in FIG. 6 and includes the following six basic components: Lighting Control Server 12 which preferably includes both a primary control server computer 24 and a secondary/backup control server computer 26; Master Interface(s) 14; Input Occupancy/Ambient Light Interface(s) 16; Output Relay/Dimmer Interface(s) 18; Input Devices including Smart Switch Devices 20 and Ambient Light/Occupancy Sensor Devices 21; and, Output Relay/Dimmer Devices 22. Each of these basic components contains a processor that controls its functions. Only information that is required to be known by another component in the control system is forwarded on via multi-drop and/or Ethernet communication connections.

As more fully discussed herein below, the lighting control server 12 is responsible for user interface functions such as inputting set points and delay settings; tying input requests to output commands; inputting switch button labels and relay descriptions; and, setting up time-clock functions. In this regard, the primary server 12 and the secondary server 26 may include keyboards 25 and monitors 27 as diagrammatically depicted in FIG. 6. Additionally, the server 12 coordinates the control system 10 as a whole, through database lookups and transmission to the master interfaces 14, the resultant of those database lookups. The lighting control system 10 is very modular in nature, can accommodate both small and large input/output count facilities/applications and, thus, can become very complex in structure. As more fully described herein below, to eliminate the complexity and make the control system 10 more user friendly, a self addressing function, also referred to herein as the auto-addressing function, is provided whereby the basic components can automatically be identified and an accurate directory/database thereof can be maintained.

Each of the basic six components and the operation thereof along with the overall control system 10 and its operation are hereinafter described.

Input Devices—Smart Switches

Figure 7:
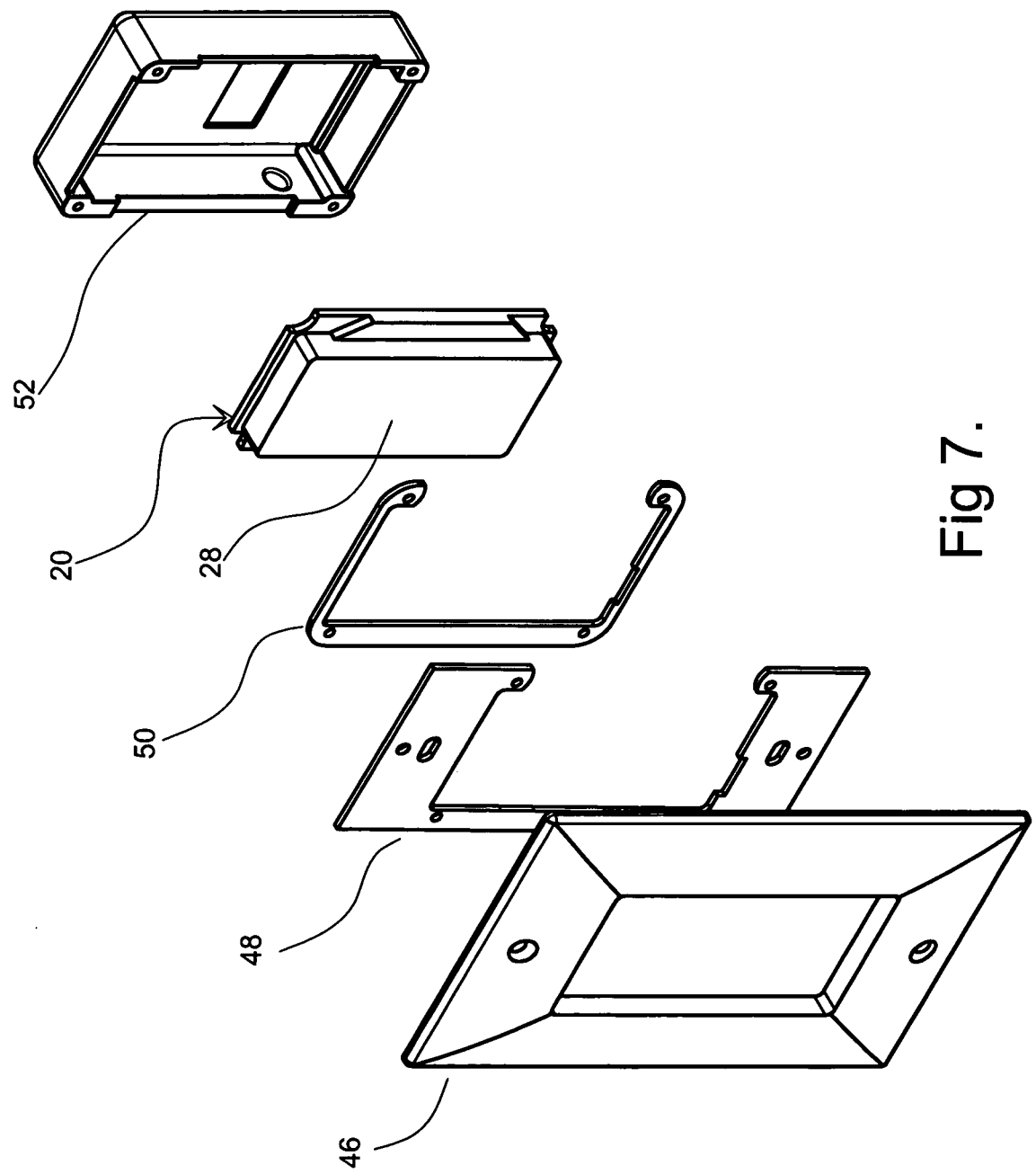
FIG. 7 is an exploded view showing a typical wall installation of a smart switch of the present invention.
Figure 8:
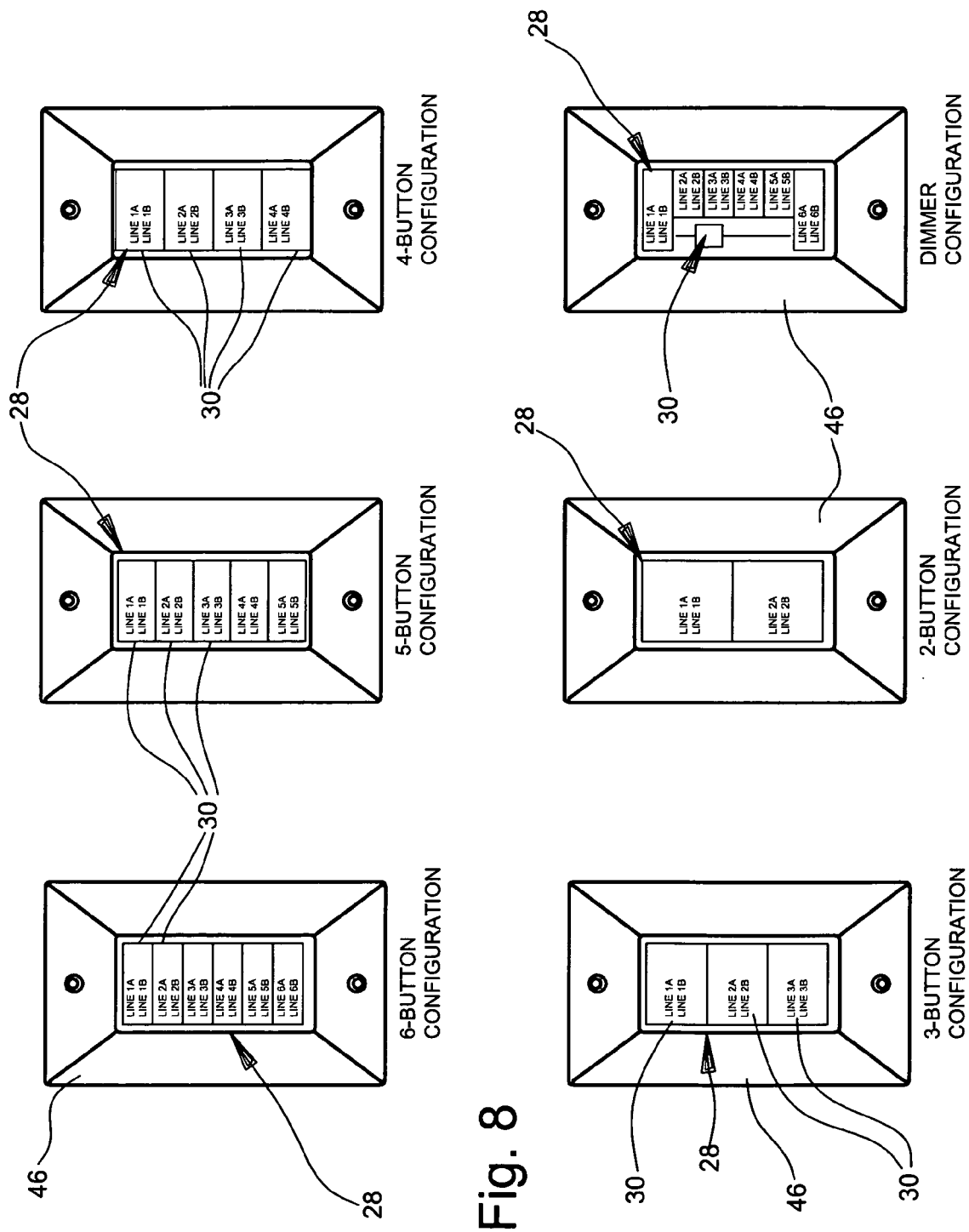
FIG. 8 are front elevation views of smart switch touch screen LCD's depicting example programmable button configurations.
Figure 9:
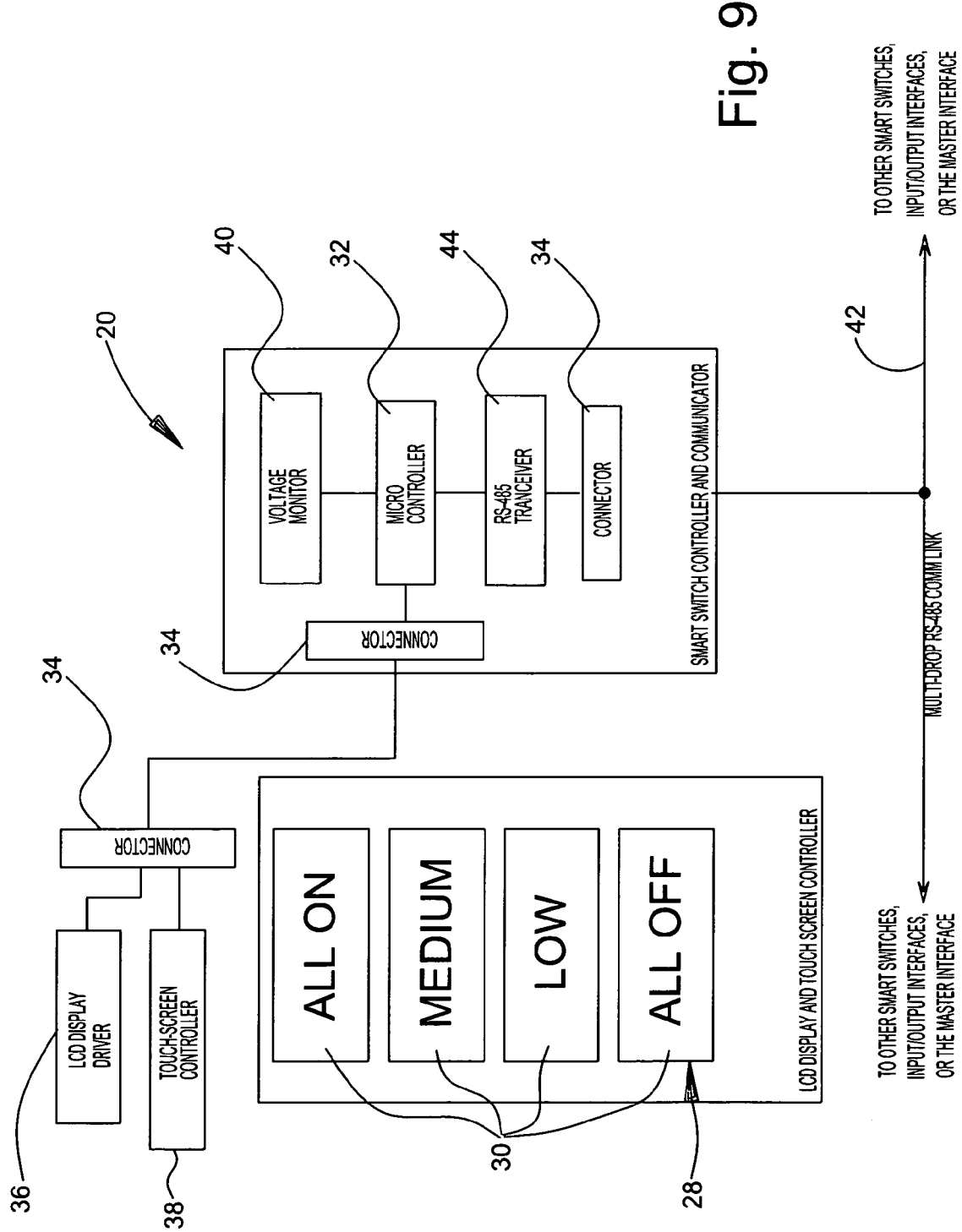
FIG. 9 is a block diagram of a smart switch constructed and connected to a lighting control system in accordance with the present invention.

The lighting control system input devices 20, 21 are devices that directly monitor the environment of a zone. The input devices include smart switches 20 and occupancy/ambient light sensors 21. As best shown in FIGS. 7-9, smart switches 20 include a touch screen LCD display 28. The function of the switches 20 as well as the appearance and operation of the display 28 are programmable via a program residing on the server 12. More particularly, an initialization menu/program at the lighting control server 12 allows the user to program the function of the switch 20, namely, the number of buttons 30 that the switch is to have. The buttons 30 are "soft" keys that are displayed on the LCD display 28. Each of the buttons 30 is further programmable to display the description of the function of that button. That function description is automatically uploaded from the lighting control server computer 12 after the system is "setup" and "linked" by the user. The "setup" and "linking" process will be described in greater detail herein below.

As best seen in the block diagram of FIG. 9, each switch 20 contains a local microcontroller 32 coupled via connectors 34 to the switch LCD display driver 36 and touch screen controller 38. Microcontroller 32 is coupled to a voltage monitor 40. Microcontroller 32 is also coupled via a RS-485 transceiver 44 and a connector 34 to the RS-485 multi-drop primary communication link 42 leading to its controlling-master interface 14.

Switches 20 are mounted in a backbox 52 with a mounting yoke 48 and spacer 50, and can be installed in common rough in boxes (not shown) in a building wall and using a wall cover plate 46 as shown in FIG. 7.

The switches 20 have several unique functions. After programming by the server 12, microcontroller 32 is responsible for maintaining the button configuration 30 and button descriptions for the switch 20; for the monitoring of "button presses" by a user; and, finally, for communicating any changes in status (button pressing) to its controlling master interface 14. It is important to note, that since the smart switches 20 each have their own microcontroller 32 and touch screen LCD display 28, they are able to communicate with a master interface 14 and display pertinent information relating to its operation to the user. As described in greater detail herein below, the smart switches 20, as well as all other components in the control system 10, are capable of monitoring and reporting their current state and voltage level at that component for thereby mapping/determining the components connection order and where a booster power supply may be needed. The component's current state is reported to the user both locally on the LCD display 28 and at the lighting control server 12.

Input Devices—Occupancy/Ambient Light Devices

The occupancy/ambient light sensor input devices 21 monitor the environment in a particular zone within or around a building for light level and motion. As best seen in the block diagram of FIG. 10, occupancy/ambient light sensor 21 includes a local microcontroller 54 coupled to an occupancy/motion sensor 56 and to an ambient light sensor 58. Similar to the smart switch 20, microcontroller 54 is coupled to a voltage monitor 40. Microcontroller 54 is also coupled via a RS-485 transceiver 44 and a connector 34 to the RS-485 multi-drop secondary communication link 60 leading to its controlling input occupancy/ambient light interface 16.

The occupancy sensor 56 monitors motion in a given zone/area. The ambient light sensor 58 monitors the ambient light level in the zone/area. The ambient light sensor 58 has three levels of sensitivity. Depending on the level of light in the monitored area, the sensor 58 will automatically adjust its sensitivity to best represent the light level. By way of example, if the light sensor 58 is placed in an area with a high level of natural ambient light (i.e. the area has a lot of windows and sky lights), it will automatically reduce its sensitivity setting to maximize the full scale of light level for that area. As more fully discussed herein below, light sensor 58 is calibrated via a self calibration procedure such that, as the level of artificial lighting changes in the monitored area (i.e. as the control system 10 changes the light level from low to medium by turning on additional relays/lights in a given area) so will the sensor 58 modify its representation of the ambient light in that area.

Each occupancy/ambient light sensor microcontroller 54 is responsible for monitoring the light sensor 58 and accurately determining the ambient light level for the zone whereat it is located, and for monitoring the occupancy sensor 56 and determining whether motion has been sensed in that same area. Additionally, the microcontroller 54 forwards this status information to its controlling input occupancy/ambient light interface 16.

Because the occupancy/ambient light sensor input devices 21 controls its own functions yet communicates with the lighting control server 12, the "on-time", also known as the "time delay", after motion is recognized is easily adjustable. More specifically, device 21 starts a timer after motion is sensed in the area. After a specified amount of time has passed (i.e. 30 minutes) and after not receiving any other motion indications within that specified amount of time, device 21, in combination with the input interface 16 and master interface 14, sends a command to the control server 12 to turn the lights off in the controlled area. Additionally, the "on-time" or "time delay" can be sent to the device 21 microcontroller 54 via the communication network, namely, through secondary link 60, input interface 16, primary link 42, master interface 14 and Ethernet link 62, and then stored by microcontroller 54. As can be appreciated, the user can thereby easily set and change, as may be needed or desired, the "on-time" or "delay time" of the input device 21 directly from the central lighting control server 12.

Figure 11A:
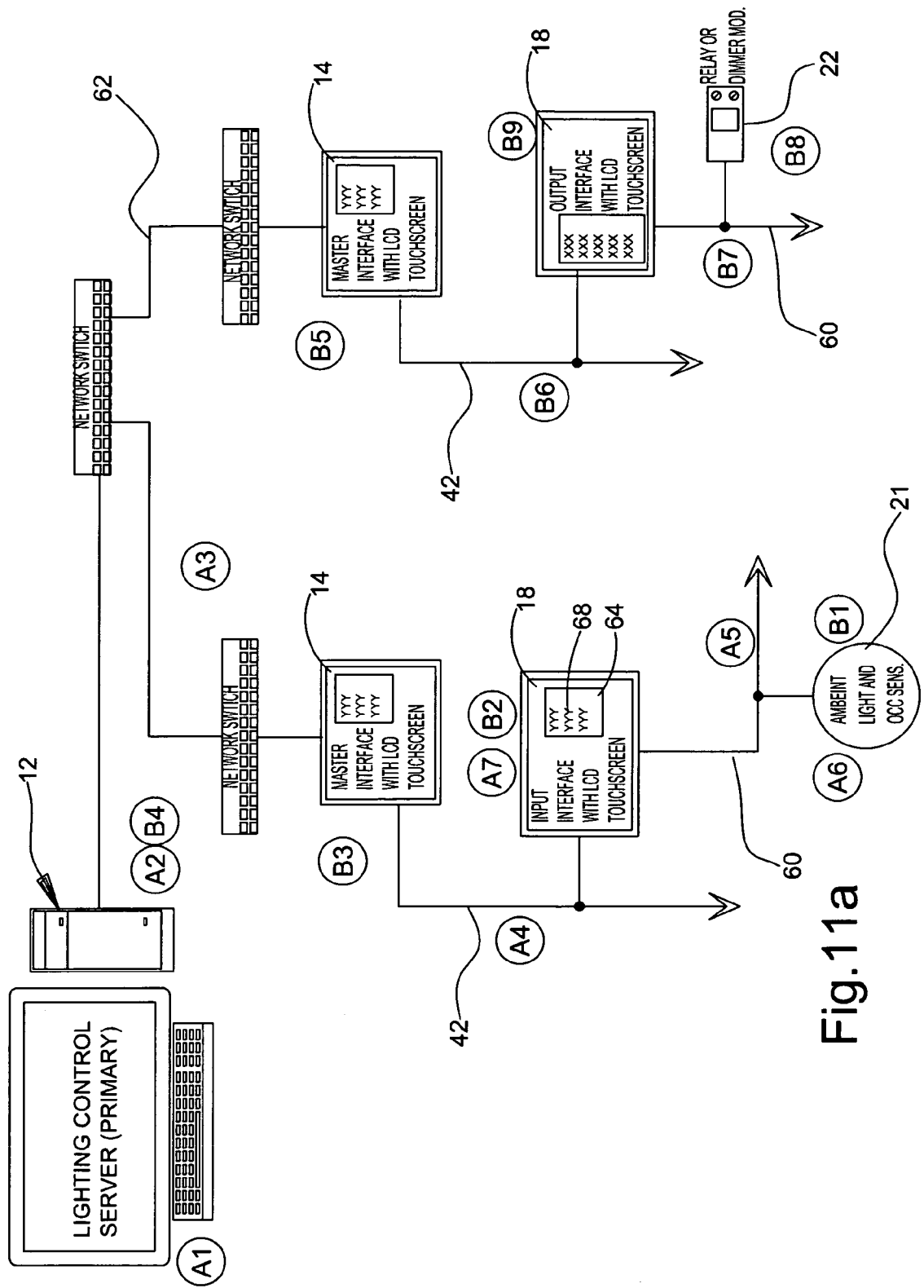
FIG. 11(a) is a schematic diagram of a control system according to the present invention.

FIG. 11 illustrates a flow diagram of the communication between the occupancy/ambient light device 21 and server 12 whereby the "delay time" can be reprogrammed/changed. At step A1, the user enters a new "delay time" at the lighting control server 12 or any other computer (not shown) that can remote link into the server 12. The database of these settings which resides on the server 12 is updated (step A2). In step A3, the new "delay time" is sent through the Ethernet link 62 to the appropriate master interface 14. The master interface 14 receives and then forwards the requested change through the primary link 42 to the appropriate input interface 16 (step A4). In step A5, the input interface 16 then forwards the change through the secondary link 60 to all of the appropriate input devices 21 under its control. Each affected device 21 then updates and stores the new "delay time" and confirms the change was made back to its controlling input interface 16 (step A6). It is noted in step A7 that, if any of the affected devices 21 does not respond with a confirming message, an error message is sent to and logged on the input interface LCD 64 and the error message is also sent back through the master interface 14 to the server 12 for logging. It is noted that the communications between the control system components is more specifically described herein below.

Like the smart switches 20, the occupancy/ambient light device 21 is capable of communicating its current state, and the voltage level at that component, back to the lighting control server 12 and to its controlling input occupancy/ambient light interface 16. The device's 21 current state and voltage level is reported to the user both at the input interface LCD 64 of the input interface 16 which is typically located generally nearby the device 21, as well as at the lighting control server 12.

It is noted that the occupancy/ambient light devices 21 do not each have their own touch screen LCD display as this would greatly increase their cost and physical size. Additionally, the occupancy/ambient light devices 21, are typically located and mounted up high on a wall or on the ceiling and, therefore, a touch screen and/or a LCD display mounted directly thereon would not be practically useable and would unnecessarily add to the cost. Instead, occupancy/ambient light devices 21 are connected via a multi-drop secondary communication link 60 to a controlling input interface 16 having a LCD 64 and whereat relevant information in connection with the devices 21 is displayed. It is noted that a total of sixteen devices 21 are allowed to be connected to each interface 16 and that all information in connection with all sixteen devices 21 is displayed on the controlling interface 16. In this manner, the user/installer is provided with a means for getting local/nearby setup and status information of each device 21 while the system cost is minimized.

It is noted also that because the occupancy/ambient light devices 21 contain an ambient light sensor 58 that is, as described herein above, capable of self adjusting its sensitivity setting, it is possible to fairly easily identify the device 21 and the input interface 16 and, thus, on the control system 10. That is, pointing a flashlight or otherwise providing another light source at the device sensor 58 will cause a spike in the light intensity reading of the device sensor 58. As further described herein below, using this phenomenon/procedure, the spike can be observed at the controlling input interface 16 LCD 64 for setting up and identifying the input device 21 on the multi-drop secondary link 60.

Input Occupancy/Ambient Light Interfaces

The input occupancy/ambient light interface 16 are used to collect, display locally, and pass on to the controlling master interface 14 the status of the occupancy/ambient light devices 21 in one or several zones. A block diagram of a typical input occupancy/ambient light interface 16 is shown in FIG. 12. Each input interface 16 contains a local microcontroller 66 coupled to a LCD display and controller 64 and a touch screen controller 68. Microcontroller 66 is coupled to a voltage monitor 40. Microcontroller 66 is coupled via a RS-485 transceiver 44 and a connector 34 to the RS-485 multi-drop primary communication link 42 leading to its controlling master interface 14. Microcontroller 66 is also coupled via a RS-485 transceiver 44 and a connector 34 to the RS-485 multi-drop secondary communication link 60 leading to up to sixteen occupancy/ambient light devices 21.

Typically, an input interface 16 will be installed and reside locally/nearby the area where the occupancy/ambient light devices 21 it interfaces with, are installed. The physical geographic location of the interface 16 is not a requirement due to electrical constraints (i.e. cable length or data transmission rate) but, rather, it is a practical issue when setting up the connected sensors/devices 21 which it controls. The occupancy/ambient light devices 21, as noted above, are "daisy-chained" from device to device with a maximum of sixteen sensors/devices 21 per input interface 16. Each device 21 is "assigned" a unique address from the server 12 via the controlling master interface 14 and input interface 16. If a particular zone or area requires several sensors/devices 21 to adequately cover the square footage or shape thereof, that grouping information is passed on to and "grouped" at the lighting control server 12. This allows the sensors/devices 21 in a large or oddly shaped room to act and/or be treated as one common sensor/device 21.

The sensors/devices 21, with the help of their controlling input interface 16, individually or collectively control a zone or area within or outside the controlled facility. A zone may be an office, a hallway, a conference room, a lobby, a parking lot or any other area that would be considered an area within or outside a building. Each zone may contain multiple levels of lighting, but should typically operate as a unit. For example, a conference room may contain separate control levels for each of a can light circuit, a chandelier circuit, and a general fluorescent lighting circuit, but the general ambient light level for the entire conference room and or motion within the conference room should typically be represented as one area/zone. Any motion within that room or zone will trigger an event that is taken care of pursuant to the desired programmed response at the server 12. That is, the motion within the room or zone is not broken up into the back part or front part of the room/zone. The sensors/devices 21, input interfaces 16, master interfaces 14 and lighting control server 12 all work together to control the lighting in a given area/zone. If a sensor/device 21 recognizes movement in a given area, that sensor/device 21 will forward that event to its controlling input interface 16. The input interface then forwards that event on to the lighting control server 12 through the applicable master interface 14. The lighting control server 12 then looks up in its database what to do when that event is triggered. It also checks all other sensors/devices 21 that are "grouped" with this sensor/device 21 to check their status. The following actions and results are preformed based on the quantity of sensors/devices 21 in a given area or zone:

If a zone contains just one occupancy/ambient light devices 21, then that sensor/device 21 has total control of the area when active. The light level is, therefore, controlled based on the light level as determined by that sole sensor/device 21. Additionally, any motion in the room will initiate an "on" command back to the lighting control server 12. After the prescribed "delay time" without any motion, the sensor/device will initiate an "off" command which is sent back to the lighting control server 12.

If a zone contains several occupancy/ambient light devices 21 that are grouped together, then the control scheme/process implemented by the control system 10 is as follows. The ambient light level in the particular area/zone all of the "grouped" sensors are polled and averaged. The continuous polling is done by the input interface 16 and sent to the server 12. The averaging is done by the lighting control server 12. The server 12 maintains a list of devices that are "grouped" together. Before a change to the light level (based on a change to the ambient light level) is initiated by the lighting control server, the server 12 first averages the light level from all grouped devices 21 in the applicable area/zone and then, based on the averaged ambient light level and pre-programmed desired result, proceeds to change the light in the area/zone to the desired level. Likewise, when a motion event is encountered by one of the sensors/devices 21, that information is passed on to the input interface 16. The input interface 16 then forwards that information through its master interface 14 to the lighting control server 14, and starts an internal timer on the input interface 16. If that same sensor/device 21 does not receive any additional motion events before the timer times out then an "off" event is passed on to the lighting control server. However, before the "off" event is passed on from the lighting control server 12 to the appropriate output relay/dimmer interface 18 and associated relays or dimmers, the lighting control server 12 first verifies that no other sensors/devices 21 of the same group are recognizing motion. If any of the other sensors/devices 21 are recognizing motion than the "off" command is delayed until all grouped sensors/devices 21 do not see motion in their field of view. More simply stated an ON event is triggered by an OR condition of any sensor/device 21 that is part of the zone's group. An OFF event is triggered by an AND condition of all sensors/devices 21 in that same group. The following formulas are used to represent the lighting control scheme for a zone/area with multiple sensors/devices which are grouped together.

LIGHT LEVEL=(SENSOR $A$ light level)+(SENSOR $B$ light level)+ . . . (SENSOR $N$ light level)/(Total Number of Sensors in the zone's group)

ON EVENT=(SENSOR $A$ has motion) OR (SENSOR $B$ has motion) OR . . . (SENSOR $N$ has motion)

OFF EVENT=(SENSOR $A$ has no motion) AND (SENSOR $B$ has no motion) AND . . . (SENSOR $N$ has no motion)

It is further noted that, because the "grouping" and conditioning control of the sensors/devices 21 is performed at the central lighting control server 12, sensors/devices 21 which are controlled by multiple input interfaces 16 can also be "grouped" together. Accordingly, the installer need not know or otherwise keep track of how the system is going to be setup (or grouped) when installing/wiring the system. Additionally, the lighting control server 12 has the ability to "verify" the status of a given zone/area before it triggers an event. For example, if the lighting control server 12 were to miss an off event from one of the occupancy/ambient light devices 21, then the "state" of that zone would be incorrectly represented at the server 12. Advantageously, however, since the lighting control server 12 can communicate with each input interface 16, the server 12 can verify the state of each of the grouped sensors/devices 21 prior to initiating an ON or OFF command.

Also, since the input interfaces 16 include a local LCD display 64, the "status" of each sensor/device 21 can be identified and viewed locally/nearby, as the sensors/devices 21 see it, of the applicable room/zone. Additionally, the input interfaces 16 simplify the wiring/installation of the up to sixteen sensors/devices 21 within a room or across several rooms since the devices 21 can be wired in any order without regard to location or cable drop point.

Figure 13:
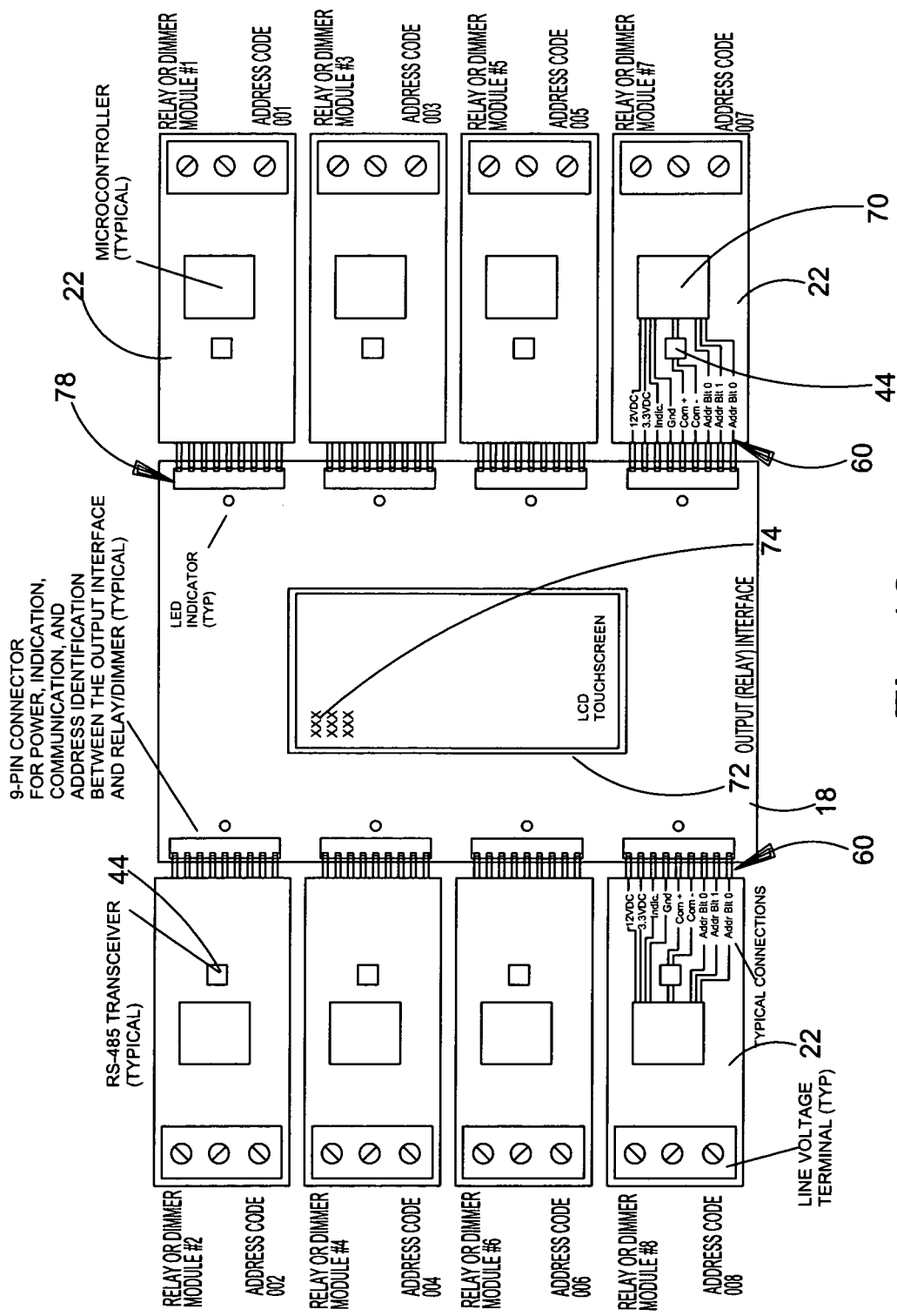
FIG. 13 is a block diagram of an output interface connected to relay/dimmer devices in accordance with the present invention.

Output Relay/Dimmer Devices

Where the input devices 20, 21 monitor the environment of a zone; the output devices 22 control the environment of a zone. FIG. 13 shows a block diagram of typical output relay/dimmer devices 22 and how they connect with the output relay/dimmer interfaces 18. Output devices 22 can include lighting control relays (single pole and two-pole) and dimmers (incandescent/LED/fluorescent). Each such output device 22 includes a local microcontroller 70 which is coupled to and controls the on and off status of the relay/dimmer and utilizes a combination of a mechanical relay and electronic control to turn on and off the circuit to the load. Microcontroller 70 is also coupled via a RS-485 transceiver 44 and a RS-485 multi-drop secondary communication link 60 directly to the output interface 18. Microcontroller 70 is capable of determining the location/address whereat the device 22 is plugged into the output interface 18, and to communicate this and other information such as the device 22 characteristics (i.e. a single or double pole relay) to the output interface 18.

Devices 22 which function as lighting control relays, like other devices 22, each contain a local microcontroller and is connected directly to an output interface 18. Like other devices 22, it communicates directly with the output interfaces 18 via a communication link 60 which is imprinted directly onto the output interface 18 circuit board. Additionally, the devices/relays 22 are able to determine the location whereat they are plugged into the output interface 18. The devices/relays 22 are able to use this information and communicate it to the server through the output interface 18 and master interface 14 (i.e. whether it is a single or double pole relay and where it is located in the control system/communication network). The devices/relays 22 are capable of being configured as either a single pole device (for 120V and 277V loads) or a double pole device for (208V or 480V loads). A double pole configuration is provided by plugging in a second relay module into the first. The microcontroller 70 of the controlling module/device 22 acknowledges the additional pole (module/device) and automatically forwards this information onto the output interface 18 whereby this information is then passed on through the master interface 14 to the lighting control server 12. The microcontroller 70 controls the on and off status of the device/relay 22. In this regard, the device/relay 22 utilizes a combination of a mechanical relay and an electronic control to turn on and off the circuit to the load. Essentially, the device/relay 22 is a microcontroller based controller wherein the microcontroller determines and communicates its associated relay's location, the type of relay it is to the server 12, and wherein it efficiently controls the connected load. The microcontroller 70 thereof is also capable of detecting and communication error information back to the server 12 through it controlling output interface 18 and master interface 14.

Devices 22 which function as incandescent lighting dimmers, like the on/off relays discussed herein above, each have a local microcontroller 70. The devices/dimmers 22 have the same physical dimension as the lighting control devices/relays 22. Additionally they have the same pin connections for connecting and communicating via a RS-485 multi-drop secondary communication link 60 to the output interface 18. Thus they are interchangeable with the devices/relays 22 and are able to communicate the same/similar information back and forth with the relay interfaces 18. The devices/dimmers 22, however, are capable of reducing the power output to the load (light). They do this by first receiving a command of "light level" from the output interface 18 in lieu of an on/off command. They then use the "light level" information to adjust the power output to the load via a dimming circuit. Like the lighting control device/relay 22, the incandescent lighting devices/dimmers 22 communicate the same or similar information back and forth to the server 12 through the output interface 18 and master interface 14 (location, type and status, etc.).

Devices 22 which function as LED/fluorescent lighting dimmers are also similar to the 2-pole lighting control devices/relays 22 described herein above. They use the same second module as the $2^{nd}$ pole of the 2-pole lighting control device/relay 22. However, the second pole is used to turn on/off the required switched circuit to the dimming ballast. The dimmed output from the dimmer module is used to provide the dimmed circuit to the dimming ballast of the LED or fluorescent light fixture. When the second pole module is plugged into the dimmer it automatically recognizes this configuration and now represents itself as an LED/fluorescent lighting dimmer in lieu of an incandescent lighting dimmer to the relay interface. All other functions of this dimmer are the same as the incandescent lighting device/dimmer 22 described herein above.

Output Relay/Dimmer Interfaces

Output relay/dimmer interfaces 18 are generally the output equivalent to the input interfaces 16. The output interfaces 18 are used to control the above described devices 22 (relays and dimmers). Like the input interfaces 16, the output interfaces 18 communicate with the master interfaces 14. The output interfaces 18 control (turn on, off or dim as appropriate) the output devices 12 which are connected to them. The output interfaces 18 receive commands via a primary communication link 42 from the master interface 14 as to what devices 22 (relays or dimmers) are to be controlled and to what level (on, off or dimmer level). Additionally, the output interfaces 18 forward information from each of the connected devices 22 (relays and/or dimmers) back to the master interface 14. This information can include the characteristics of the devices 22 connected at each of its ports/connections, and the current status of each such device 22 (if it is on, off or to what level it is dimmed at).

Figure 14:
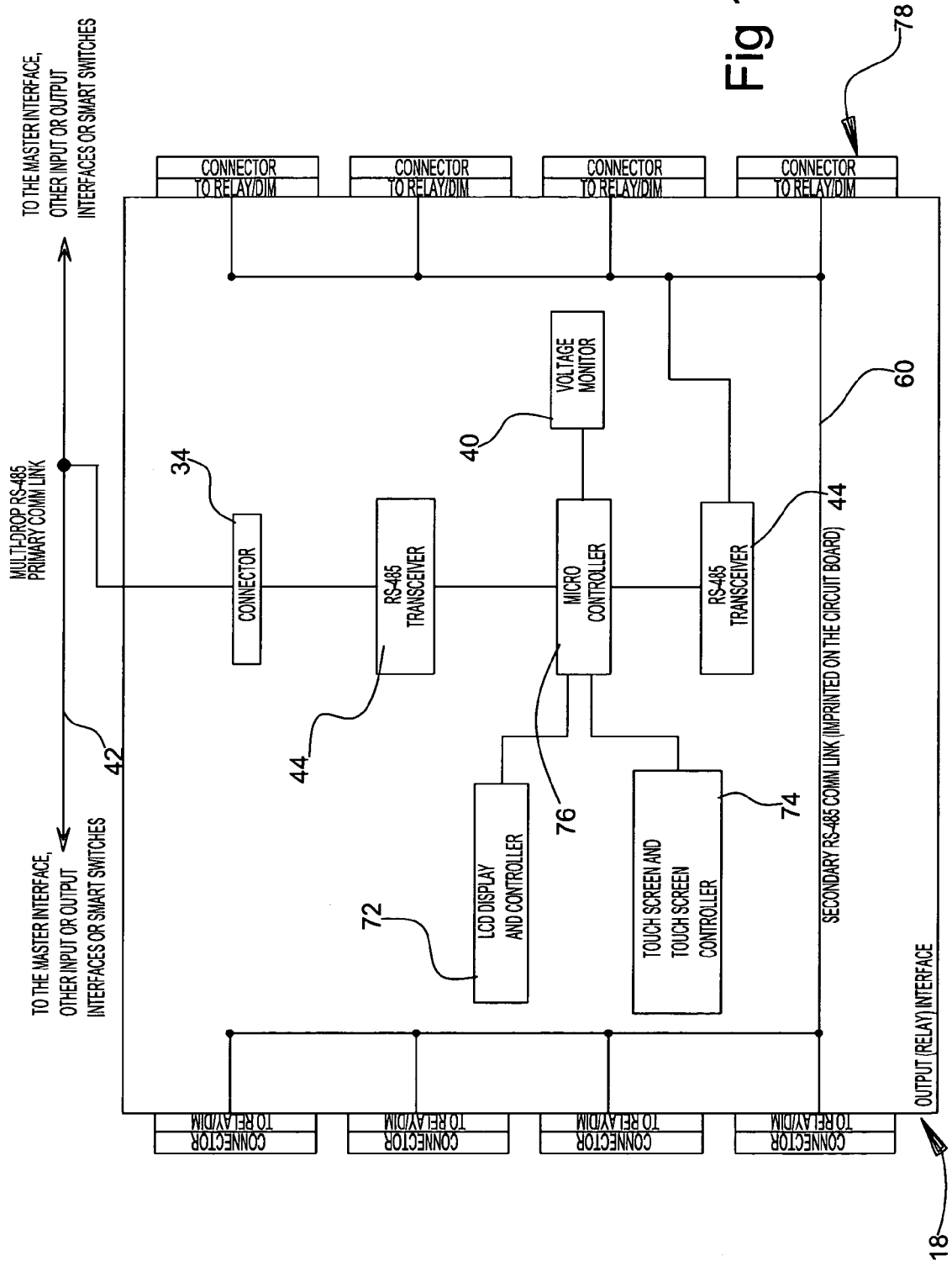
FIG. 14 is a block diagram of an output interface constructed and connected to a lighting control system in accordance with the present invention.

A block diagram of a typical output relay/dimmer interface 18 is shown in FIG. 14. Similar to the input interfaces 16, the output interfaces 18 are provided with a local LCD 72 and touch screen 74 for indication and local control of the aforementioned status information. This allows the user and/or installer to view locally and directly such information and status thereof. The output interfaces 18 also contain a local microcontroller 76 which is coupled to the LCD display and controller 72 and the touch screen controller 74. Microcontroller 76 is coupled to a voltage monitor 40. Microcontroller 76 is coupled via a RS-485 transceiver 44 and a connector 34 to the RS-485 multi-drop primary communication link 42 leading to its controlling master interface 14. Microcontroller 76 is also coupled via a RS-485 transceiver 44 and to the RS-485 multi-drop secondary communication link 60 to the pin sockets/connectors 78 whereby up to eight devices 22 (relays and/or dimmers) can be connected as depicted in FIG. 13.

It is noted that the LCD 72 also serves as a local circuit directory for the user during installation and/or for maintenance purposes. This directory includes a cross reference between the connected devices/relays 22 and a description of the controlled load (i.e. "Conference Room Can Lights"). This directory can be of significant assistance and can significantly decrease time and costs when troubleshooting malfunctions and making future modifications. Since all of this information is collected at the lighting control server 12, it can easily be forwarded on to the local LCD display 72 of the output interface 18. All additions and/or changes of the devices 12 are handled automatically at the server 12 and each of the descriptions of the loads for which a connected device 12 (relay or dimmer) is connected is then displayed by default on the LCD display 72. Should the user want to see different information (i.e. status info) at the local LCD display 72, they can merely press one of the local menu sequence buttons on the touch screen 74.

Master Interfaces

Master interfaces 14 are used to collect the status changes in any zone, via a primary communication link 42, from the input occupancy/ambient interfaces 16 and smart switches 20, and to command changes to the output interfaces 18, also via the primary communication link 42. Each of the interfaces, whether input or output, are connected in a daisy-chain fashion to the primary communication cable/link 42. This communication cable/link 42 also acts as a power cable and provides power to each of the connected components 16, 18 and 20. As more fully described herein below, by sharing a common power supply cable, the voltage level at each component is monitored for thereby mapping/determining the components connection order and where a booster power supply may be needed.

Figure 16:
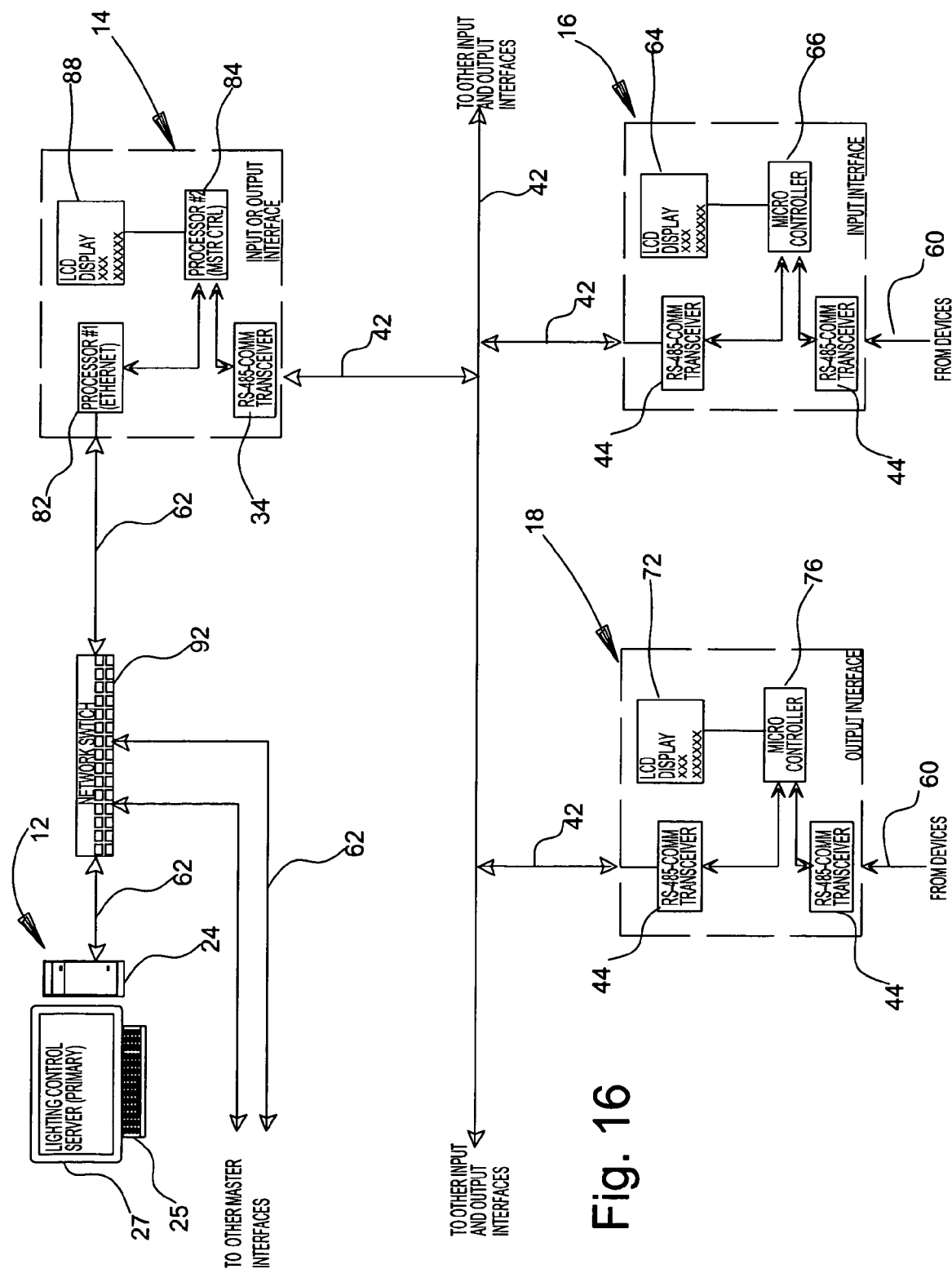
FIG. 16 is a schematic diagram of the master interface communication connection to the input and output interfaces.

Like the secondary communication link wiring 60 between the input interfaces 16 and the input devices 21 (Ambient/Occupancy Sensors); the primary communication link wiring 42 between the master interface 14 and the input interfaces 16, the smart switches 20 and the output interfaces 18 can be connected without regard to order and type. FIG. 16 diagrammatically shows a typical connection scheme of this portion of the control system 10. As shown, an Ethernet connection/link 62 connects master interface 14 to the server 12.

Figure 15:
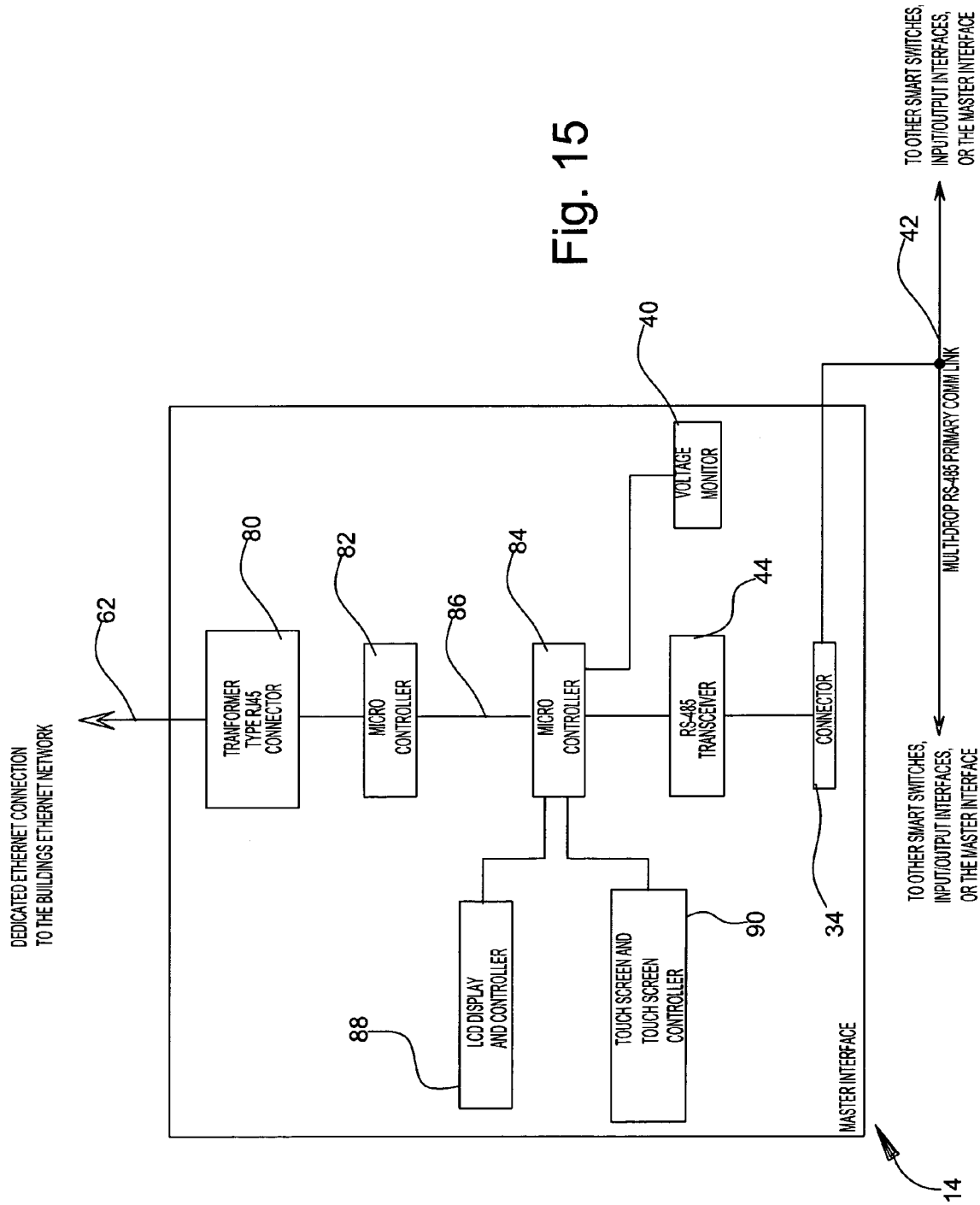
FIG. 15 is a block diagram of a master interface constructed and connected to a lighting control system in accordance with the present invention.

A block diagram of the master interface 14 is shown in FIG. 15. Master interface 14 has two processors/microcontrollers, namely, an Ethernet processor 82 and a master processor 84. Processors 82, 84 are connected to one another with a dedicated serial communication link 86. Ethernet microcontroller 82 is coupled via an Ethernet connector 80 and the Ethernet link 62 to the server 12. The master microcontroller 84 is coupled via a RS-485 transceiver 44 and a connector 34 to the RS-485 multi-drop primary communication link 42 leading to the interfaces 16, 18 and smart switches 20. The master microcontroller 84 is also coupled to a LCD display and controller 88 as well as a touch screen controller 90. Master microcontroller 84 is coupled to a voltage monitor 40.

The master interfaces 14 are a key part of the control system 10 and make the control system modular. Master interfaces 14 are used to collect and distribute information back and forth from the interfaces 14, 18 and smart switches 20 to the lighting control server 12. The master interfaces 14 perform several key functions in the control system 10. First, as more fully discussed herein below, they act as interpreters between the building's Ethernet (data) network and the communication network of input and output interfaces 14, 16 and smart switches 20. Second, the master interfaces 14 act as collection managers. For example, when several commands are received from several of the input or output interfaces 16, 18 or smart switches 20 (i.e. button being pushed), the master interface 14 collects that information and packets it in an efficient manner to be sent to the lighting control server 12. Finally, master interfaces 14 maintain a local data table of all of the connected components 14, 16, 18, 20 and 21 for determining system health and status. Like the input and output interfaces 16 and 18, it too has a local LCD display 88 and touch screen 90 for local feedback to the user during installation and troubleshooting.

By using master interfaces 14 and thereby providing communications between the control network and the Ethernet network, the control system 10 can virtually include an unlimited number of input and output components 14, 16, 18, 20 and 21. Since the number of master interfaces 14 is only limited by the limits of the Ethernet network, through the use of local microcontrollers for collection and efficient packaging of communicated information, an almost unlimited number of input and output points can be realized. This structure allows for an efficient and cost effective solution for both small scale and large scale applications.

Lighting Control Server

The lighting control server 12 serves two basic functions. First, the lighting control server 12 acts as a database server—a function that a computer does very well. When a master interface 14 (via Ethernet communication) sends an event change or group of event changes, from one of the zones which it is controlling, to the lighting control server 12, the server 12 looks up in a database (that resides on the lighting control server 12) what to do with that event. The server 12 then queries its database for the output event or events that is/are to be performed when the applicable input event is encountered. The server 12 then organizes a string of commands to be sent to the master interface(s) 14 that control the applicable output interface(s) 18 that control the output event (relay turning on or off, etc.).

A second function of the lighting control server 12 is to act as a direct and integral interface of the lighting control system 10 and the user programmer. The key point here is that the server 12 it is an integral part of the lighting control system; therefore, it acts as a simple and seamless interface with the lighting control system 10. The function of programming the system is handled by a software user interface that resides on the server 12. This interface can access the database (that also resides on the server 12) directly. This greatly simplifies the programming of the control system 10. No uploads and downloads are required between the lighting control system 10 and the programming computer/server 12 as they are the same device accessing the same database directly. The commands to and from the master interfaces 14 are administered by a "Service" running on the lighting control server 12. This service runs independent and continuously on that server 12 as long as it is powered up.

As a resultant of this arrangement, and since the server 12 acts as a node on the building's Ethernet network 62, an additional secondary/backup server 26 can be added and coordinated with the primary lighting control server 24 (this would provide a level of redundancy in the system should that be a concern).

The server 12 can also be accessed from any other computer (with the proper security privileges) on the building's Ethernet network 62 via common remote interfaces available (such as Microsoft's Remote Desktop or a client application). This allows the server 12 to physically reside anywhere in the building and to be accessed at any physical location in the building with a computer and proper security privileges. For example, this would allow the lighting control server to reside in the IT department's main distribution frame (MDF). A computer in the maintenance department could be granted privileges to access the server 12 for programming changes; or, a computer in the area to be controlled can be used for adjustments to the lighting level in a particular area. The flexibility of the lighting control server 12 being a node on the building's Ethernet network 62 allows all of the above described functionality and various other options for user interface as will become evident to one skilled in the art.

The above described basic six components 12, 14, 16, 18, 20 and 21 are programmed and work together as further described herein below so as to provide to a centralized building lighting control system 10. The overall or central control scheme is first herein after described, namely, how the components 12, 14, 16, 18, 20 and 21 talk to each other (communicate); how they update their firmware; and, finally, what the significance of the local LCD touch screen displays have in the system makeup.

System Control Schema—Communication

In general, control system 10 has three levels of communication with the master interface 14 being the center thereof. The master interface 14 has two processors 82, 84 that are connected directly to one another with a dedicated serial communication link 86. The Ethernet processor 82 is dedicated to communications with the Ethernet network 62 to the lighting control server 12. As data becomes available (either incoming from the Ethernet network 62 or outgoing from the master processor 84) the data is loaded in one of two circular buffers. Data coming in is loaded in one of the buffers; data going out is loaded in the other buffer. As shown in FIG. 16, the master processor 84 is used to communicate with the input and output interfaces 16, 18 and the smart switches 20 on the primary RS-485 multi-drop communication link 42.

The communication between the lighting control server 12 and the master interfaces 14 is done via standard Ethernet TCP/IP communication protocols. Both of the subsequent levels of communication (the primary communication link 42 and secondary communication link 60) utilize a RS-485 multi-drop, addressable communication protocol.

Figure 17:
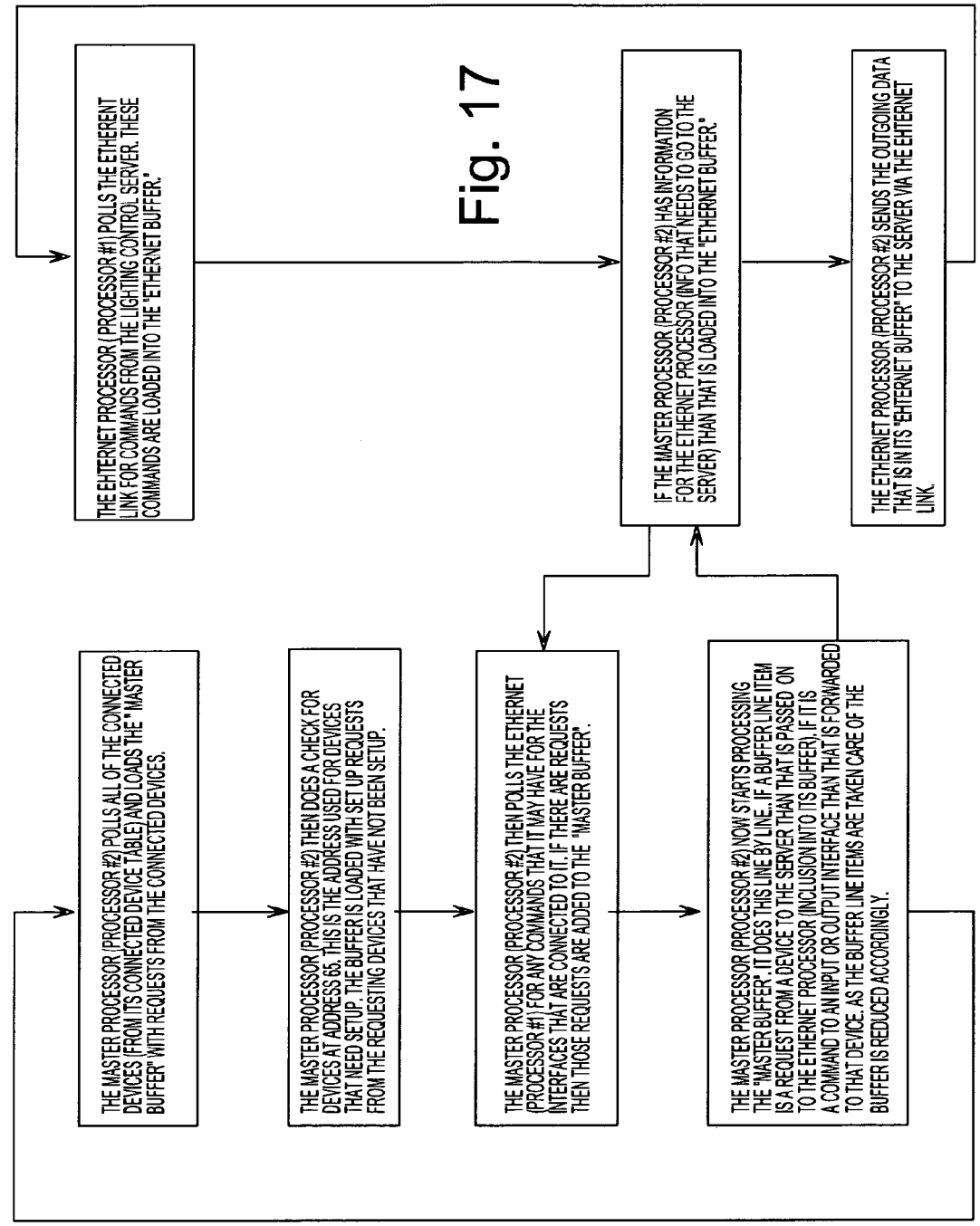
FIG. 17 is a flow diagram illustrating the internal communications of the master interface.

FIG. 17 shows a flow diagram of how the master interface 14 collects, organizes and distributes information collected from both the Ethernet network 62 and the primary RS-485 link 42. The first level of communication is between the lighting control server 12 and the master interface 14. It is first important to understand how the master interface 14 connects with the lighting control server 12. When connected to the building's computer (data) Ethernet network 62, a master interface 14 is programmed to and will obtain an IP address automatically from the data network's controller (i.e. router). Likewise, when the lighting control server 12 is connected to the building's computer (data) Ethernet network 62, it will also obtain an IP address from the building's data network controller (i.e. router). After the master interface 14 has obtained its IP address it is programmed to and will then poll or broadcast its initialization information packet to the system for a lighting control server 12. The lighting control server 12 has a unique identifying code to distinguish it from other connected devices. The master interface initialization information packet includes its IP address. When the lighting control server 12 responds, it forwards its IP address back to the master interface. Accordingly, two-way communication is thereby established (typically within milliseconds) between the server 12 and master interface 14. Should power go down or a loss of IP address occur for any reason from one or all of the master interfaces 14 and/or lighting control server 12, the same procedure will be re-initiated to re-establish communications automatically. After a connection has been established, data to and from the Ethernet network 62 is managed using the Ethernet processor 82 circular buffers described herein above. The LCD display 88 on each master interface 14 is programmed to and is able to present the automatically connected IP address should the user need to troubleshoot connection issues. The procedure listed above allows the master interface and lighting control server to connect automatically in a DHCP environment. If a static IP scheme is employed at the facility where the lighting control system is installed the installer can simply set the IP address of each master interface and the lighting control server via the LCD touchscreens and the graphical user interface, respectively.

The next level of communications is between the master interfaces 14 and the smart switches 20, the input interfaces 16 and the output interfaces 18 and is accomplished with an RS-485, multi-drop, secondary link 60. The master interface is programmed to take the lead in this communication connection. In order for the components 16, 18 and 20 to communicate with each other, the master interface 14 first assigns an address to each as more fully described herein below in the Auto-Addressing section. This address is automatically cross-linked with an ID that is established at the lighting control server. The cross-linked ID is what is displayed and used for setup and installation of the system. After the interfaces 16, 18 and switches 20 are assigned an address, they are programmed to and capable of communicating with the master interface 14. The master interface 14 initiates all communication at this level. That is, the master interface 14 polls each interface 16, 18 and switches, one after another, until it reaches the last connected address. It then returns to the first address under its command and starts the process over. In between each such polling cycle of the interfaces 16, 18 and smart switches 20, the master interface processor 82 reads its incoming Ethernet circular buffer and writes to its outgoing Ethernet circular buffer as appropriate.

Figure 18:
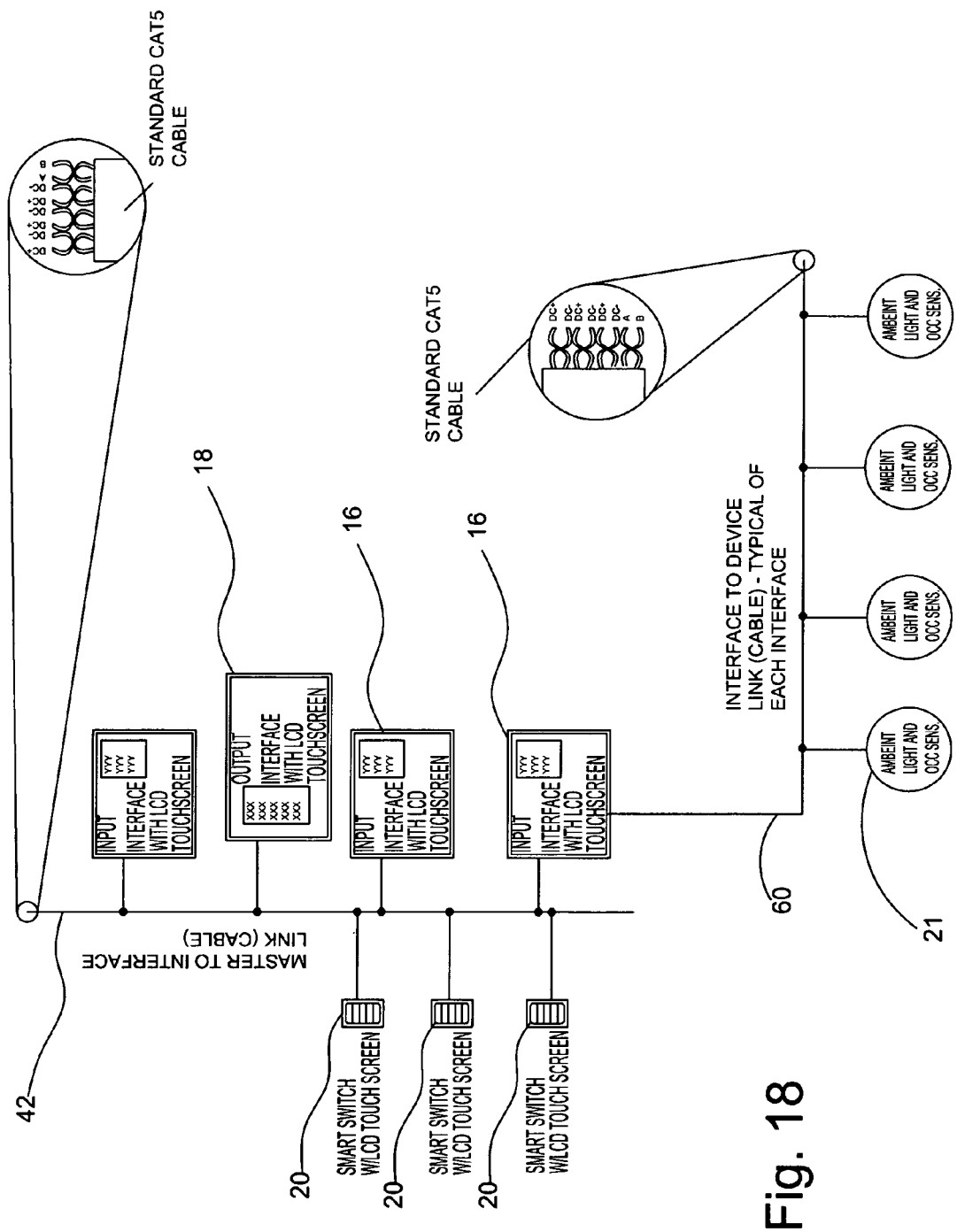
FIG. 18 is wiring diagram of the primary and secondary communication links.
Figure 19:
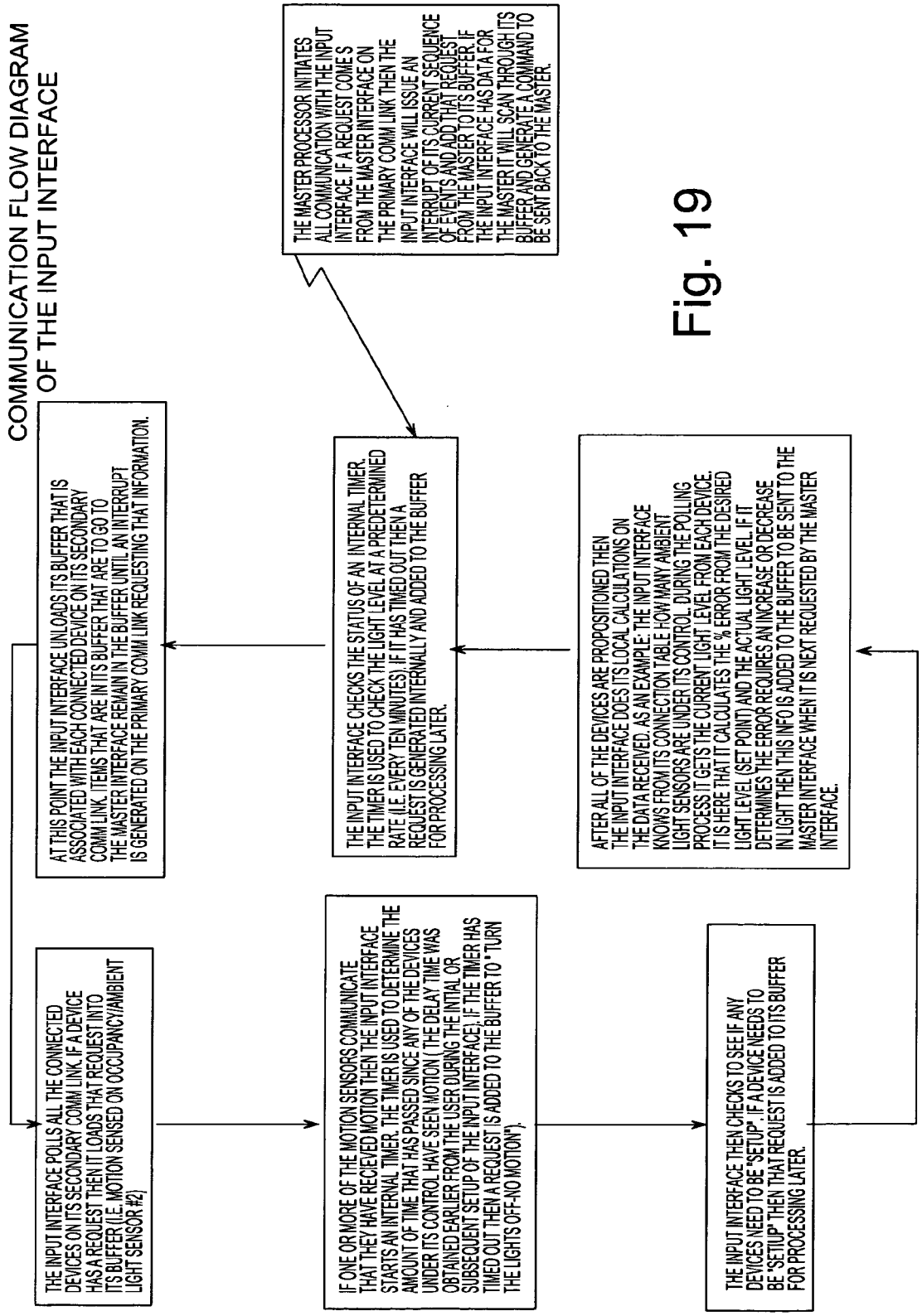
FIG. 19 is a flow diagram illustrating the input interface communications.
Figure 20:
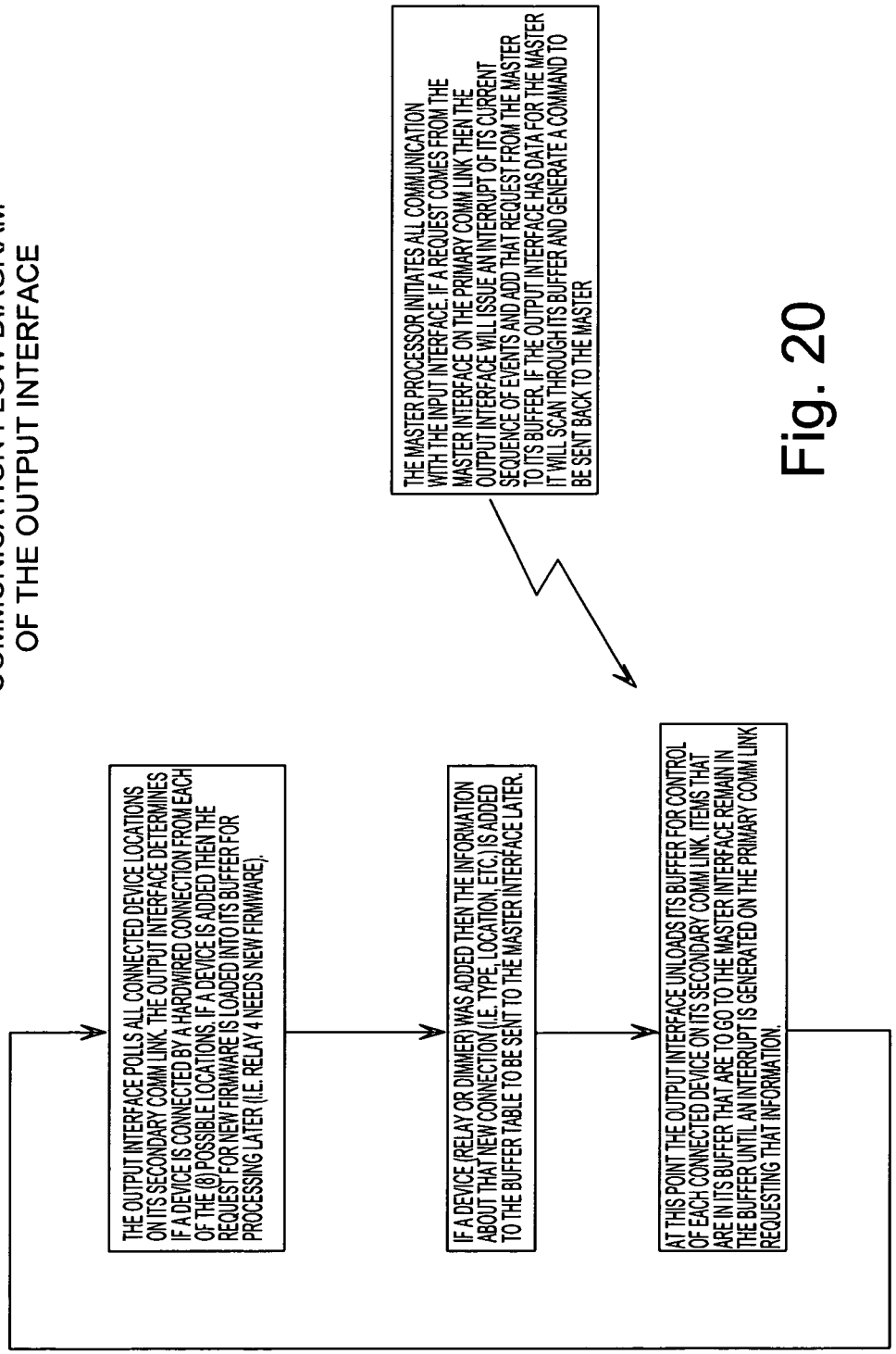
FIG. 20 is a flow diagram illustrating the output interface communications.

The lowest level of communication is the secondary RS-485, multi drop communication link 60. As described herein above, unlike the master interfaces 14, the input and output interfaces 16, 18 contain just one processor. Each of these processors has two serial ports, one to talk to each of the primary and secondary RS-485 links 42, 60. FIG. 18 shows a typical input and/or output interface 16, 18 communication connection scheme/link 60. The secondary communication link 60 is responsible for communications between the respective input or output interface 16, 18 and its corresponding occupancy/ambient light sensor devices 21 and output relays and/or dimmers devices 22. FIGS. 19 and 20 show and describe the operational/program flow diagrams for the communication methods of the input and output interfaces 16, 18 respectively.

System Firmware Coordination and Setup

The control system 10 includes an updating method for allowing firmware/software features to be added and "bugs" worked out of the firmware for all components 12, 14, 16, 18 and 20 in the system. The updating method/scheme is needed because the control system 10, as described herein above, is modular. Additionally, because the control system 10 is expandable, and because of the likely hood of expansion is probable, the updating method for firmware upgrade (or downgrade) is seamless and automatic.

The following example illustrates the system firmware updating method:

A lighting control system 20 is initially installed having one Master Interface 14, three Output Interfaces 18, and twenty relay devices 22. Thereafter, it is desired to add four more relay devices 18. The firmware installed (at the factory) on the four new relay devices 22 is a newer revision/version than the firmware on the prior installed output interface 18. It is desired to maintain and continue to use the firmware on the prior installed output interface 18.

Figure 21:
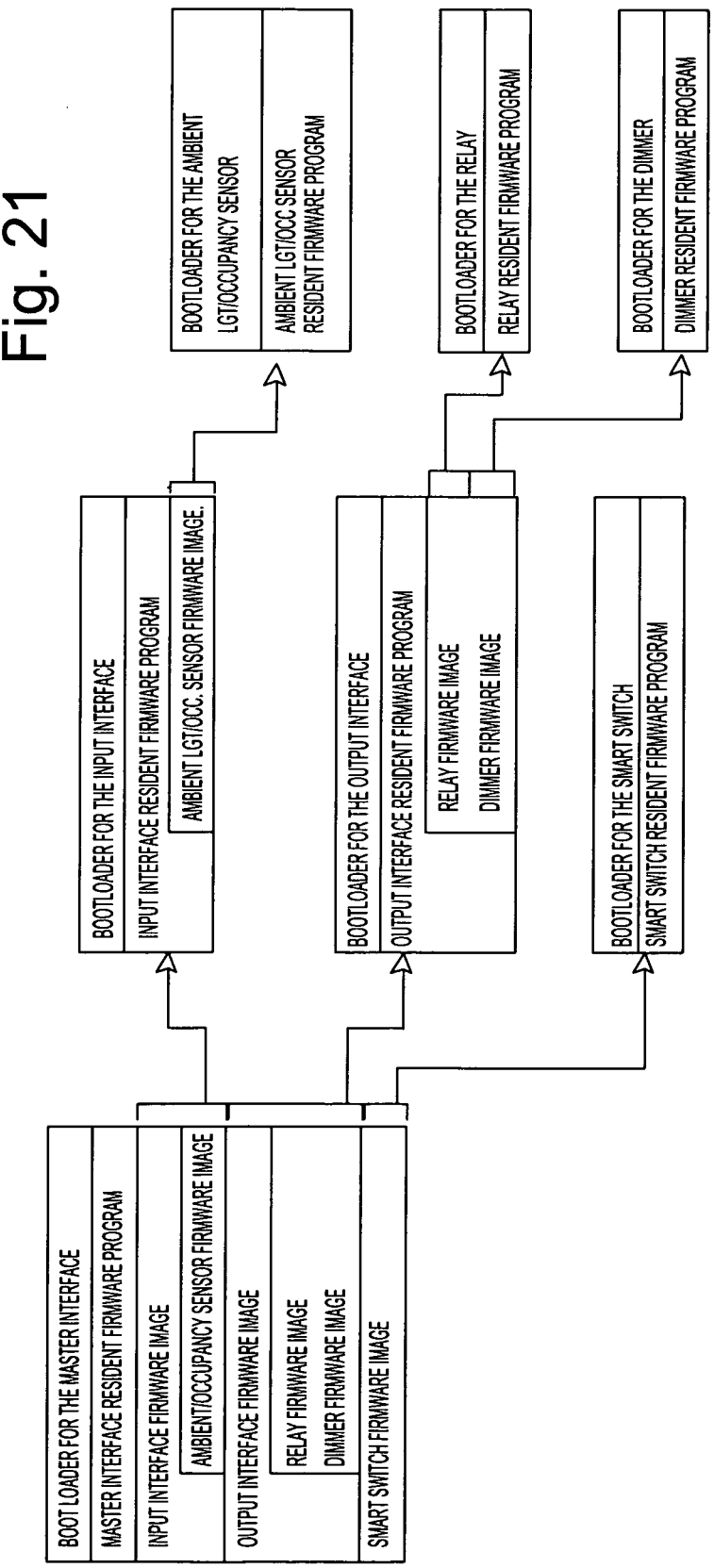
FIG. 21 is a schematic diagram of the firmware upgrade hierarchy.

In the above example the new relay devices 22 and output interfaces 18 may not communicate all commands correctly because of the different levels/versions of firmware installed on each. In this regard, the updating method includes a "trickle down" firmware modification method/scheme. In this regard, FIG. 21 shows how the firmware for each level is stored. The subsequent/lower levels (i.e. the input interface 16 is a subsequent/lower level to the master interface 14) are stored and maintained as an image in memory on the higher level component. When a component/device is connected to the higher level component/device (i.e. when a relay 22 is connected to the output interface 18 such as in the above example) the lower level component/device is queried by the higher level component/device. It is noted that the initialization and communications information packets also include the firmware number/version identification. If the firmware versions do not match, then the newly connected component/device sets a location in EEPROM and then resets itself. Upon a reset, each microcontroller enters its boot-loader function/process. In the boot-loader function, the component/device checks to see if the EEPROM code is set. If so, it erases the resident firmware program and requests the firmware program that is imaged on the higher level component/device to which it is connected. The higher level component/device then downloads the applicable firmware to the newly connected lower level component/device. Upon receipt of the firmware from the higher lever component the newly connected component/device resets its EERPOM location and resets itself again. This time, the boot-loader on the newly connected component/device recognizes that the change in EEPROM location and immediately jumps to the newly loaded firmware program. Normal operation then resumes. This same technique applies to all components 16, 18 and 20 and devices 21, 21 and levels of the control system 10.

If a completely new version of firmware is desired for the entire control system 10, the new firmware is downloaded through the Ethernet connection to the master interface 14 via a menu selection of the graphical user interface program residing on the lighting control server 12. Once the boot-loader of the master interface 14 finishes updating its firmware and storing the subsequent firmware images, the lower lever/order components will automatically propagate the new revisions throughout the system using the method described above.

Significance of Local Touch Screen LCD Displays

Another unique feature of this invention is the way that it conveys information on a local level to the user. Each interface whether it be a master interface 14, input interface 16, an output interface 18 or smart switch 20, as described herein above, has its own LCD touch screen display. The LCD displays are used for many functions including communicating to the user/installer interface/switch status, communication status, connection status and, in the case of the output interface 18, the circuit (switch-leg) descriptions. Switches 20, as described herein above, also display button configurations and button labels (descriptions).

When descriptions of the connected loads (switch-legs) are entered/provided at the lighting control server 12, that information is passed on to the corresponding output interface 18 so that it can be displayed on its LCD display 72. Any changes made to the descriptions in the lighting control server 12 are automatically updated to the applicable output interface 18.

The significance of the local LCD displays is also evident with the smart switches 20. With the LCD display 28 on the switch 20, the user is able to coordinate buttons 30 configurations as desired through interactive menus on the lighting control server 12. The switch 20 automatically uploads configuration information and descriptions for each of its buttons 30 after a description is entered or updates are made. This eliminates the need for engraved or worse yet unmarked face plates describing each button.

Auto Addressing

A significant advantage of the control system 10 is its ability to self address each of the components 12, 14, 16, 18, 20, 21 and 22. This is made possible because, as described herein above, each component includes a microcontroller. Each microcontroller contains a limited amount of non-volatile memory (EERPOM memory) whereat an auto addressing program/process is able to store status information for coordinating and maintaining an address for itself and the rest of the system components. That is, a primary function of each of the microcontrollers 32, 54, 66, 70, 76, 82 and 84 is to coordinate and maintain an address protocol for the control system 10.

As described herein above, the lighting control server 12 resides over the master interfaces 14; the master interfaces reside over the multi-function smart switches 20, the output interfaces 18 and input interfaces 16; the output interfaces reside over the relays and dimmers devices 22; and, the input interfaces 16 reside over the occupancy/ambient light sensor devices 21. This topology allows for the higher order device (i.e. master interfaces 14) to communicate directly with the lower order devices (i.e. input/output interfaces 16, 18), and also allows the higher order components to address and maintain a table of connected components/devices for the lower order devices. Although the method of addressing may differ slightly for the type of component/device (input components/devices vs. output components/devices) the overall method/scheme is generally the same.

Figure 22:
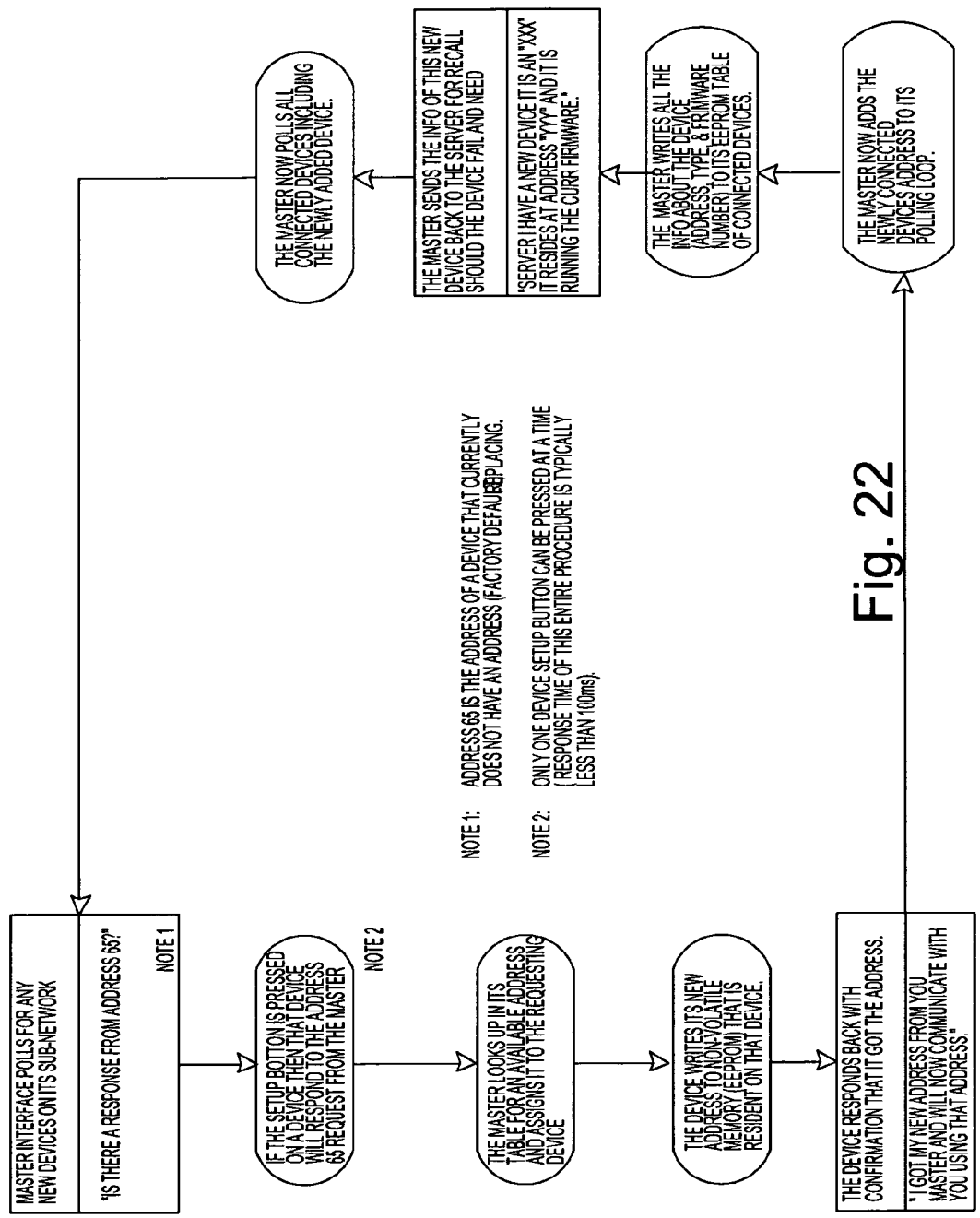
FIG. 22 is a flow diagram illustrating the addressing protocol.

As described herein above, all of the communications between the various components/devices (except with the server 12) utilize a multi-drop RS-485 communication schema. Separate RS-485 communication links are established for each "level" of the system (i.e. the master interface 14 to input interface 16 communication is separate from the input interface 16 to occupancy/ambient light sensor input devices 21 communication). An exemplary and representative flow diagram describing the method of the self-addressing protocol is shown in FIG. 22 whereat the self-addressing method/scheme between a master interface 14 and its subsequent/lower level input interfaces 16 and output interfaces 18 is described.

It is noted that the local LCD displays 68, 72 and 28 (located on each of the input or output interfaces 16, 18 and switches 20) perform at least two functions during the self-addressing and setup process. First, it steps the user through the process as the new component/device is addressed. That is, each step is displayed on the applicable LCD so the user is aware of what is transpiring. For example, when a new smart switch 20 is first connected via the primary link 42 with a master interface 14, the switch LCD 28 displays a message indicating that the switch "Has not been setup/addressed" and presents/displays a "setup button" 30 for the user/installer to press to begin setup/addressing process. Once the user/installer presses the setup button 30, the switch LCD 28 displays/presents a bar graph showing the progression of the setup/addressing process. After the switch has obtained its address, it is programmed to and checks with the master interface for firmware compatibility/equality. If the firmware on the switch 20 and master interface do not match, then a request and subsequent transfer of firmware is performed between the two components as described herein above. As also described herein above, this is possible because the firmware for the switch 20 resides in memory as an image on the master interface 14. The firmware coordination/updating process can take several seconds and the LCD display 28 again displays/presents a bar graph representing the status of the firmware coordination/update.

A second function of the local LCD displays 68, 72 and 28 during setup/addressing is to allow the user/installer to identify the component/device for "linking". Linking is performed, as more fully described herein below, at the server 12 to allow the real/physical component/device to function the same as the virtual component/device that is programmed and visible on the monitor at the lighting control server. For assisting in performing the linking sequence/process, the component/device ID (cross-referenced from the device's address) is displayed on the local LCD displays 68, 72 and 28 for easy viewing by the user/installer.

It is noted that, if a component/device fails and need replacing, the new component/device can be installed using the same ID, and likewise, address as the old component/device. Each component/device includes a physical "setup button" or one is programmed and displayed on its LCD (or on its controlling interface 16, 18 LCD) via its respective touch screen controller 38, 68, 74, 90 as, for example, described herein above in connection with the smart switches 20. For example, when a replacement input/output interface 16, 18 is connected to the primary link 42, the master interface propositions the new/replacement input/output interface 16, 18 and initializes the set procedure and, when the setup button is pressed on or in connection with the newly added component/device, the installer is also prompted if the new/replacement interface 16, 18 should be installed using the same ID and corresponding address as the old component/device. Accordingly, the installer can elect to use the same ID/address of the old missing component/device or request a new ID/address. If the existing but unused ID/address is selected, all previously programmed and linked interactions with the old component/device from the server 12 will now apply to the new/replacement component/device.

It is also noted that, if a component/device become unavailable or otherwise is no longer available or is missing on the network, the lighting control server 12 is programmed to and will display the virtual previously linked icon of that component/device with a red "X" through it. Accordingly, the user viewing the server 12 monitor will know that that previously linked component/device is no longer being recognized and can take corrective measures as needed. All other previously programmed functions of the control system 10 will still be available, but that component/device will not be active since it is "missing".

If the user deletes a component/device at the lighting control server 12 (a device does not need to be missing to be deleted), then a command from the server 12 is sent to the applicable controlling interfaces 14, 16, 18 to remove that component/device from their respective tables. If the component/device is still available (if it is still physically connected to the control system network) the component/device will again regain the 65 address ID and will be become ready for a "new installation" setup button press.

As previously mentioned, the setup and addressing protocol and method/scheme between the master interfaces 14 and their connected input/output interfaces 16, 18 is the same as that described above between the master interface 14 and the smart switches 20. In connection with the setup and addressing procedure between the input interfaces 16 and the ambient/occupancy sensor devices 21, it is noted that the ambient/occupancy sensor devices 21 do not contain a local LCD. However, devices 21 include a light sensor 58 which, in conjunction with a flashlight or other similar light source, can be used to assign an address thereto. In the procedure for setting up an ambient/occupancy sensor device 21, the installer/user first selects the input point on the controlling input interface 16 by pressing a soft key/"setup button" on the local touch-screen display 66, 68 representing the input device 21 to be setup. It is noted that up to sixteen devices 21 can be connected to one input interface 16, and the status of all sixteen devices 21 is displayed on their controlling interface LCD screen 66. The displayed status includes an indication showing if the device 21 is setup and the address thereof or, if it is not yet set up, an available "connection point/button". To set up and address a device 21, the installer selects a desired connection point and presses the "connection point/button" on the touch-screen display 66, 68. The interface 16 then causes all of the devices 21 that are physically connected (wired) to it but are not yet addressed or setup to flash an LED light which is physically located on the devices 21. The installer can, thus, physically see the devices 21 which are not yet addressed or setup. By then pointing a common flashlight or other light at the device light sensor 58 which is to be connected to that "connection point", the device 21 is programmed to and will recognize the spike in its light level and request that connection point address from its input interface 16. All devices 21 under that interface 16 will then stop blinking their LED's until another setup request is given by pressing another available "connection point/button" at the input interface 16.

Once a device 16 has received its address, it is programmed to and then goes through the procedure described herein above to coordinate and/or update or obtain the compatible version of firmware. Should the user/installer want to see the address of a device 21 at a later date, the input interface 16 can be placed in a "check address mode" by pressing a soft button of the controlling interface LCD 66, 68 whereby, by pointing a flashlight at a device light sensor 58, both the device LED will be caused to blink and the input connection point of the input interface 16 will display indication thereof.

The setup and addressing protocol and method/scheme between the output interfaces 18 and the output devices 22 is substantially the same as between the master interface 14 to input/output interface 16, 18 in regards to the deletion or loss of a device 22. The creation/assignment of a device 22 address is also similar, except that the output relay/dimmer device 22 is physically plugged into a specific port/pin socket 78 on the output interface 18. Thus, the address which is assigned to the device 22 is the port/pin socket 78 to which it is attached. There are a maximum of eight available addresses (0-7) per output interface 18. The addresses are assigned by the device 22 being plugged into an output interface pin socket 78 and a fixed code on three of the connection pins/wires between the device 22 and the output interface 18. The three pins/wires use a binary code to represent the pin socket 78 location of the device 22. FIG. 13 shows the address/access code for each pin socket 78 location whereat an output relay/dimmer device 22 can be plugged into and connected to the output interface 18. The output interface 18 continually scans each connection points 78 to verify whether or not a device 22 is present. After the address of a device 22 is established, the output interface is programmed to and requests additional information from the output device 22, including the type of output device it is (single pole relay, two pole relay, incandescent dimmer, or fluorescent dimmer). The output interface 18 can then use this information to update its table of connected devices 22 and pass the device information to its controlling master interface 14 whereat the maser interface 14 updates its table of connected components/devices. The master interface then passes on the information to the server 12 for updating the connected components/devices table on the server 12.

It is noted that the highest level of communication is between the master interface 14 and the lighting control server 12. This communication is via standard Ethernet protocols and standard network switches 92, thus, no special auto-addressing procedures are required. This communication is setup using standard TCP/IP protocols. The lighting control server 12 does assign each master interface 12 and ID so the user is able to distinguish it when "linking" components of the system, but this ID is independent from its IP address that is assigned by the network's router. It also noted that the "missing device" and device deletion methods described above are used here also with the master interfaces 14. Database tables on the server 12 are updated and modified for the master interfaces 14 like any other device in the system.

Linking

The procedures mentioned herein above for "setup" and addressing are used to identify the components/device on the control system network. Each component/device 14, 16, 18, 20, 21 and 22 is identified by a nomenclature which uses the address of its higher level/controlling components. Because a master interface 14 is the highest order component in the control system 10 requiring addressing, when it is added to the control system, it obtains its cross-referenced ID from the lighting control server 12. When the lighting control server 12 recognizes a new master interface, it assigns it an ID of "M"+the next available number (i.e. M1, M2, M3, etc.). The master interface 14 is responsible for assigning the ID of its lower lever connected components/devices. Their ID is composed of both the master interface's ID plus an identifier representing their type plus the next available number. For example, an output (Relay) interface 18 would have an address ID like M1_RI3. In this case, "M1" represents the ID of its controlling master interface, the "RI" (relay interface) identifies the type of output interface 18 it is, and the "3" represents the address number of the output interface 18. It is noted that up to sixty components/devices are possible on a primary communication link 42. The following table illustrates several examples of the addressing nomenclature of control system components:

| DEVICE DESCRIPTION | ALTERNATE DESCRIPTION | ADDRESS ID |
|---|---|---|
| MASTER INTERFACE (14) | | M9 |
| OUTPUT INTERFACE (18) | RELAY INTERFACE | M9_RI9 |
| INPUT INTERFACE (16) | AMBIENT/OCC INTERFACE | M9_II9 |
| SWITCH (20) | | M9_S9 |
| RELAY OR DIMMER (22) | | M9_RI9_R9 |
| AMBIENT/OCCUPANCY SENSOR (21) | | M9_II9_A9 |

The above describe address ID of each component is used at the server 12 to "represent" that component in the control system. When programming a new component/device at the server 12, a "virtual" component/device is first established. For example, if a new switch 20 is to be added to the control system, the user would create a new virtual switch using the graphical interface program on the server 12. The configuration of the switch would first be selected, i.e. 2 button, 3 button, etc. Then a description would be provided for each button 30 (this description will appear on the physical switch LCD 28 buttons 30). After the virtual switch is established, it can be "dropped" into a group of virtual devices 22 that it is to control. This group of devices can be one or more of a collection of switches, relays, time-clocks, dimmers, etc. that are to work together in controlling or lighting the inside or outside the building/facility. This "dropping" of each component into each group of devices is done by a standard drag and drop procedure common to many software applications (similar to moving a file between folders on a hard drive). Accordingly, the items that are grouped can be coordinated to control the components of that group.

For example, if a zone (or group) has three light levels controlled by three relays 22, two five button switches 20, and a time-clock (the "time clock" can be "virtual" in the sense that it is programmed to operate the relays based on the server clock), the user/installer can assign the operation of various relay devices 22 to various buttons 30 of the two switches 20. Additionally, the user can assign the relay devices to be overridden by the virtual time clock which has been established and is part of that group. Since all of the components in that group represent a small sub-system of the larger control system 10, the user can easily create complex/desired control schemes for that group. By combining this feature with the ability for each component/device to communicate with one another, complicated control schemes are simply a matter of dragging and dropping between components.

By way of another example, assume that the user/installer wants to have the lights go to an AUTO mode every morning at 7:30 AM (in the AUTO mode, the lights should turn on only when an occupant is in the room); the level of lighting is to be determined by the ambient light sensor 58 of the ambient/occupancy device 21; and, the user/occupant should have the ability to go to a fixed level (i.e. low level) when a "LOW LEVEL" button 30 is pressed on the local smart switch 20. This is all simply coordinated/programmed by first creating a group; creating a time clock with the "7:30 AM turn all lights off for the grouped lights and put the group into AUTO mode" (enabling the motion sensor(s) and the ambient light detector(s) of the group); creating a Virtual Smart Switch with "OFF", "LOW LEVEL", and "AUTO MODE" for the button descriptions; creating a Virtual Dimmer or several Virtual Relays to control the lights in that area; and finally dropping all of the affected devices into the newly created group. All functions and coordination between the grouped devices are now available for the drag and drop operations within that group. In order for the "LOW LEVEL" function to operate when the corresponding button is pressed the programmer simply drags the relays that are to turn on or off into the appropriate boxes labeled "On" and "Off" after highlighting the "LOW LEVEL" button of the Virtual Switch". Additionally, the "AUTO MODE" function is dragged into the "Off" box telling the system to turn off the AUTO MODE function (i.e. to stop controlling the lights by reference to ambient light level and motion). Another requirement of the example was to have the lights of the affected group go into an AUTO MODE at 7:30 AM. This is done by opening up the time-clock that represents that function of the group and dragging the AUTO MODE function into the "On" Box. One note regarding all of the devices of the system—each device can be dragged and dropped into individual or multiple groups. An example of this is with our 7:30 AM time-clock. That same time-clock can be assigned to several groups if desired and can perform different functions in each group should that be desired (i.e. it may tell all interior zones to go to AUTO MODE and tell all exterior lights to turn off).

The developing of "virtual devices" and "grouping" of those devices allows the programmer to "pre-setup" the system as a whole prior to having the physical components/ devices installed or setup on the system. The method to "link" the physical component/device to the virtual device uses the same procedure as that described above. It is noted that when a physical component/device is setup on the system, the lighting control server generates a unique ID for it that is displayed on the server until it is linked on the server 12. That ID is also available at any time on the local component LCD display by pressing and holding a spot anywhere on the touch-screen for several seconds. The user can use the displayed ID's of unlinked devices on the server and "link" them to a desired virtual device. This is done by dragging the virtual device on top of the unassigned physical device ID. Only like types of components/devices are shown for linking when performing this procedure. This eliminates, for example, the possibility of linking a virtual switch to a physical input interface 16. When the virtual device is linked to the physical device, the virtual device is no longer listed in the list of "Available Unlinked Virtual Devices" and it now shares the space of the device ID. The result is a "colored" icon at the device ID along with the device ID and the descriptions and aspects of the virtual device. Through the use of "right click" menus the process, becomes faster and more efficient for the programmer.

Self Calibration

Energy conservation is a motivating factor for incorporating a lighting control system in a facility. It is desirable to provide lighting only when needed and then, preferably, only at an intensity sufficient for the intended use. It is also desirable to use natural/ambient light when available, and thereby decrease the artificial light being provided from light fixtures and, hence, the power consumption.

In this regard, a deficiency with existing lighting control systems is their ability to accurately represent the steady state light conditions of a room or area. Some existing lighting control systems use ambient light sensors in an attempt to conserve energy. However, the ambient light sensors, as they are used in existing lighting control systems, are unable to correctly/accurately represent the light level in the room or area as they do not perform a "profile" for the controlled area/room. Moreover, the setup procedure for the light sensors is tedious and inaccurate.

A prior art/existing method of using light sensors is depicted in FIG. 23. As diagrammatically shown therein, the full range of the sensor is used to represent the light level in the room (not the actual range of light conditions of the room being detected). Several user defined "on" set-points and "off" set-points are programmed into the system wherein the differential between each "on" set-point and "off" set-point is small. A small differential is used so as to reduce the likelihood of cycling of the controlling relay around the on/off set-point. There are, however, several problems with this prior art/existing method. First, the user must monitor the light level in the controlled areas/rooms to determine all of the on and off set points and how they correspond to the desired light level for the area/room for differing levels of natural light. If this was required for only one area in a building, this may not be a difficult task, but when it is required throughout the facility with the windows in rooms facing different directions, the task can be daunting. Accordingly, set up requires highly experiences installers and is typically time consuming and costly. The end result is inaccurate control of light levels due to the lack of time or experience by the installers. Another problem with the prior art/existing control systems is the inability to accurately measure the natural (or ambient) light level without influence from artificial light sources (i.e. the light fixtures that are being turned on and off in the area being sensed/monitored). How the lights in the controlled room affect the light level with varying conditions can make the success of calibrating this type of system borderline effective and frustrating.

The present light control system 10 overcomes the disadvantages of the prior systems by developing a light profile, through the use of its input occupancy/ambient light interface 16, for the light level in the area which the sensors are representing. This light profile is then used as the basis for the desired control scheme. In this regard, a dynamic profile is generated using the steady-state light level as the reference point for control. The steady-state light level is the actual ambient light level in a particular area with no influence by artificial lighting. The steady-state light level will change as the amount of natural (ambient) light changes, but that is insignificant when determining a profile for the controlled area. An example to aid in defining the ambient light for an area is: in an area with an exterior window, the ambient light level would be the lighting level in the room without influence from the light fixtures in that room. To profile the room, each level of lighting must be introduced into the equation and its resultant change in light level stored as a reference point for each added level of light (i.e. a relay is turned on, the light level is read by the ambient light sensor in that area, and the change in light level is stored with the relay information in a database resident on the lighting control server. This is detailed more specifically here: the microcontrollers on both the ambient light sensors 58, the input interface 16, the output interfaces and the relays/dimmers are coordinated to work together with the lighting control server 12 to develop the profile. Since all of the previously noted components are controlled and "grouped" together by the lighting control server a area/room profile is a simple matter of initiating the sequence by the user. This initiation can start at either the lighting control server or one of the input interfaces. The method for initiating the room profile is slightly different when originating from either the lighting control server or one of the input interfaces, but the result is the same. In order to initiate a room profile event from one of the input interface the user must first determine which group (area) is to be profiled. A list of groups is stored at each input interface to allow the user to select from. The group information is automatically sent from the lighting control server to each input interface when a new group is established at the lighting control server. In order for a group to be eligible for profiling is the presence of an ambient light sensor in that group. This requirement is determined and maintained automatically by the lighting control server. The process to profile a room/area/group is as follows:

The user simply scrolls through each group description for which an area/room can be profiled either at the input interface or the lighting control server. When an area/group is selected a soft button labeled "Profile Area/Room" is presented for the user to press. Upon pressing this button the process begins. First the lighting control server sends an OFF command to each relay/dimmer included in the group to be profiled. Then the lighting control server requests from the ambient/occupancy sensor(s) (through the various communication links) in the group to be profiled a light level reading. This is the steady-state light level for the area. If there are multiple sensors in the area/group then the average of those readings is stored. This information is stored in a database residing on the lighting control server with the appropriate group. Next the lighting control server issues a command to one of the relays or dimmers in the group to turn ON (again through the various communication links). Again the ambient/occupancy sensors are propositioned by the lighting control server for their new light level with the added level of artificial light for the area. The difference between the original "no artificial" light reading and the new "first level of light" reading is stored in a database residing on the lighting control server with the respective relay/dimmer. This process is continued until the lighting control server has measured and stored the added influence of light for each relay or dimmer in the group being profiled. After all of the available levels of artificial light (relays/dimmers) are recorded the process is repeated for a total of five times. From the results the highest and lowest readings are thrown out and the remaining three sets of samples are averaged and recorded permanently in the database residing on the lighting control server. Performing this sequence five times and eliminating the samples as stated above eliminates the influence of temporary environmental changes during the profiling process (i.e. a cloud passing over). After the profiling process is complete a message is displayed at the point of initiation (either the lighting control server or the input interface) stating that the profile process is complete. This process provides the lighting control server two vital pieces of information. First, the lighting control server now knows what influence each relay/dimmer has in regards to the added amount of artificial light for that particular relay/dimmer. Second, the lighting control server now knows the collective total amount of artificial light all of the relays/dimmers provide to an area/room/group. This is the first step in accurately and automatically controlling the light level in an area with respect to the amount of ambient light available at any given time. The next step involves polling the room/area/group periodically for the actual maximum ambient light levels. With the previously obtained profile information the lighting control server can now poll the room/area/group for its current light level. The lighting control server now has available, through the lookup in its database, what added amount of light will be present when a respective relay or dimmer is turned on. Additionally, the lighting control server can poll each ambient/occupancy sensor for the current light reading in a particular room/area/group. When the response of the current light level is sent back from the sensor to the lighting control server that information can be combined with the lookup in its database to determine what the "current" steady-state light level is. More specifically, the lighting control server takes the current light level reading from the ambient/occupancy sensor and subtracts off the previously recorded step light level(s) for each relay or dimmer that is currently ON. This provides the lighting control server the "current" steady-state light level for the area/room/group being controlled. This steady-state level is now recorded at a periodic rate (i.e. every ten minutes) for the controlled group. A maximum steady-state light level is determined for each group and that too is stored in a database. The steady-state maximums are stored for a specified amount of time (i.e. 30 days) and that information is now used to determine an average maximum steady-state light level for a given area/room/group: To "jump start" the control of the system a factory supplied default is preloaded into the data base for use until a substantial amount of data is collected (i.e. one month). To control the lighting automatically with regards to the ambient light a simple inversely proportional formula is implemented. The formula is as shown here:

$$DSP = (1 - CUR_{SSLL}/MAX_{SSLL}-)*(MAX_{AAL})$$

Where:
DSP=Desired Light Level Set Point
$CUR_{SSLL}$=Current Steady-State Light Level
$MAX_{SSLL}$=Previously Recorded Maximum Steady-State Light Level
$MAX_{AAL}$=Previously Determined Maximum Available Artificial Light The $MAX_{SSLL}$ as used in the formula above is constantly being updated and changed as the days pass and the data is updated. This allows for an automatic response to changing environmental conditions (i.e. season changing).

Once the desired setpoint (DSP) is determined the lighting control server can now lookup in its database to determine the best fit to obtain this light level. Moreover, the lighting control server reviews each possible combination of relay(s)/dimmer(s) and their respective added amount of artificial light to determine what combination will get as close as possible to the desired setpoint (DSP). This algorithm inversely scales the amount of artificial light in proportion to the maximum ambient light for a given period of time (i.e. one month). Although the concept is complex, through the utilization of the distributed control of the system the application of the algorithm is simple—a press of the "profile group" button.

The sensors 58, via the controlling program/scheme on the server 12, are constantly monitoring the light level in a given area. They are able to "record" locally the maximum and minimum light levels in that area for each change in step. This has a bonus side effect, namely, monitoring of the performance of the light fixtures. This is accomplished by comparing the original change in light level as produced by each step of light to the current change in light level by each step of light. This can only be done during the step-up or step-down process from level to level. If the "change" in light level from step to step is stored and compared, then the steady state light level is automatically averaged out of the equation. Since the system is able to monitor this change and compare that change to what is determined acceptable levels in change over time, the system is able to determine when a fixture may need cleaning or a ballast or lamp may need replacing.

Utilizing dimmable fixtures enhances the performance of the system by reducing the error of the desired light level (dimming allows for smaller light level steps).

Voltage Level Detection and Device Connection Mapping

Each component 16, 18, 20, 21 and 22 is powered from a common power supply at its master interface 14. This power feed is provided through the cable that connects each of the components/devices for communications. FIG. 24 diagrammatically shown this power feed connection scheme. As previously noted in each of the block diagrams of the components 16, 18, 20, 21 and 22 of the system, each component includes a voltage monitor 40 of its source (feed) voltage. This voltage monitor 40 is used to monitor the voltage level at that component/device. Additionally, each component/device includes its own switching voltage regulator (not shown). The voltage regulators are able to reduce the incoming voltage to a usable 3.3VDC. Due to the resistance of the wire feeding each component/device, a voltage drop is occurs throughout the branch. As the load increases (due to additional devices) and the distance increases (as referenced from the source power supply at the master interface 14) the voltage drop increases.

The voltage drop phenomenon is used in two ways. First, by monitoring the voltage level at each component/device it is possible to determine the connection order of each of the components/devices. This information is valuable to and is presented/made available to the installer in a graphical format at the lighting control server monitor. A further description of how this is accomplished is described later. The installer can use this information to aid in troubleshooting issues or to determine where best to add a device on a particular branch. Secondly, it is possible to determine where best to end the branch due to voltage drop or where to add a booster power supply along an existing branch.

The voltage at each component/device is communicated back to the server 12. The server 12 is able to use this information and produce both the connection diagram along with a graphical representation of the voltage level along the branch. This is possible because the switching voltage regulators are able to convert a wide operating range of voltages to the desired/required output of 3.3VDC. It is noted that there is a lowest acceptable input voltage is typically about 4.5VDC for each voltage regulator to be able to produce the 3.3VDC output. Because the system is able to monitor the voltage along the entire branch, from device to device, it possible to graphically show the user, at the lighting control server, where the voltage has dropped to a level below the 4.5VDC cutoff.

While this invention has been described as having an exemplary design, the present invention may be further modified within the spirit and scope of this disclosure. This application is therefore intended to cover any variations, uses, or adaptations of the invention using its general principles.

What is claimed is:

1. A control system for controlling lights within buildings, said control system comprising: a programmable lighting control server adapted to interface with a user, said server programmed to establish desired control commands, said control commands selected from the group consisting of on, off, dim, and brighten, said control commands adapted to be responsive to user inputs and environment status information, said environmental status information selected from the group consisting of ambient light and room occupancy: a master interface including at least one programmable microcontroller connected to and communicating with said server; means for communicating said environment status information and said control commands between said master interface and said server, said master interface connected to and adapted to communicate through a primary communication link; a configurable input device, said configurable input device selected from the group consisting of a configurable touch screen LCD switch, occupancy sensors, and ambient light sensors, said configurable input device comprising a programmable microcontroller connected to said primary communication link and adapted to communicate with said master interface, said configurable input device further comprising means for monitoring the environment status of a building zone and establishing environment status information, said configurable input device further comprising means for communicating said environment status information between said master interface and said configurable input device through said primary link; a configurable output device, said configurable output device selected from the group consisting of relays and dimmers, said configurable output device further comprising a programmable microcontroller connected to said primary communication link and adapted to communicate with said master interface, said configurable output device further adapted to control the light in said zone in response to a control command, said control command being communicated between said master interface and said output device through said primary link; and means to communicate said building zone environment status information between said configurable input device and said master interface and between said master interface and said server, said server further adapted to establish a desired control command responsive to said environment status information; and means to communicate said control command between said server and said master interface and between said master interface and said configurable output device whereby said light and said zone is controlled in response to said control command.

2. The lighting control system of claim 1 wherein said output device comprises:
an output interface having a programmable microcontroller connected to said primary communication link and adapted to communicate with said master interface, said control commands being communicated between said output interface and said master interface through said primary link; said output interface connected to and adapted to communicate through a secondary communication link; one of a relay or dimmer device having a programmable microcontroller connected to said secondary communication link and adapted to communicate with said output interface, said one of a relay or dimmer device being capable of controlling a light in said zone in response to a control command, said control command being communicated between said output interface and said one of a relay or dimmer device through said secondary link.

3. The lighting control system of claim 2 wherein said output interface includes a touch screen LCD connected to and being controlled by said output interface microcontroller to display information about said one of a relay or dimmer, touch screen input buttons and button descriptions, and wherein said output interface microcontroller is capable of monitoring the status of said input buttons status information being communicated between said output interface and said master interface through said primary link.

4. The lighting control system of claim 2 wherein said output interface includes an LCD connected to and being controlled by said output interface microcontroller to display information about said one of a relay or dimmer, including address information associated with said one of a relay or dimmer.

5. The lighting control system of claim 4, wherein said address information associated with said one of a relay of dimmer is established and maintained by said server, said address information being communicated between said server and said master interface and between said master interface and said output interface through said primary link.

6. The lighting control system of claim 2 wherein each of said master interface, output interface and said one of a relay or dimmer device are identified in the control system with a unique address, said unique addresses being established and maintained by said server and wherein unique addresses are communicated between said server and said master interface, between said master interface and said output interface through said primary link and between said output interface and said of a relay or dimmer device through said secondary link.

7. The lighting control system of claim 1 wherein said input device comprises: an input interface having a programmable microcontroller connected to said primary communication link and adapted to communicate with said master interface, said environment status information being communicated between said input interface and said master interface through said primary link; said input interface connected to and adapted to communicate through a secondary communication link; an ambient light and occupancy sensor device having a programmable microcontroller connected to said secondary communication link and adapted to communicate with said input interface, said sensor device being capable of monitoring the ambient light and motion in said building zone and establishing environment status information therefrom, said environment status information being communicated between said input interface and said sensor device through said secondary link.

8. The lighting control system of claim 7 wherein said input interface includes a touch screen LCD connected to and being controlled by said input interface microcontroller to display information about said ambient light and occupancy sensor device, touch screen input buttons and button descriptions, and wherein said input interface microcontroller is capable of monitoring the status of said input buttons and establishing environment status information therefrom, said environment status information being communicated between said input interface and said master interface through said primary link.

9. The lighting control system of claim 7 wherein said input interface includes an LCD connected to and being controlled by said input interface microcontroller to display information about said ambient light and occupancy sensor device, including address information associated with said ambient light and occupancy sensor device.

10. The lighting control system of claim 9, wherein said address information associated with said ambient light and occupancy sensor device is established and maintained by said server, said address information being communicated between said server and said master interface and between said master interface and said output interface through said primary link.

11. The lighting control system of claim 7 wherein each of said master interface, input interface and said ambient light and occupancy sensor device are identified in the control system with a unique address, said unique addresses being established and maintained by said server and wherein said unique addresses are communicated between said server and said master interface, between said master interface and said input interface through said primary link and between said input interface and said ambient light and occupancy sensor device through said secondary link.

12. The lighting control system of claim 1 wherein said input device comprises a smart switch having a programmable microcontroller connected to said primary communication link and adapted to communicate with said master interface, said smart switch having a touch screen LCD connected to and being controlled by said smart switch microcontroller to display touch screen input buttons and button descriptions, and wherein said smart switch microcontroller is capable of monitoring the status of said input buttons and establishing environment status information therefrom, said environment status information being communicated between said smart switch and said master interface through said primary link.

13. The lighting control system of claim 12 wherein each of said master interface and said smart switch are identified in the control system with a unique address, said unique addresses being established and maintained by said server and wherein said unique addresses are communicated between said server and said master interface and between said master interface and said smart switch through said primary link.

14. The lighting control system of claim 1 wherein said master interface includes a power source connected to and providing power to each of said input device and output device through said primary link in a daisy chain, wherein each of said input device and output device include a voltage monitor capable of monitoring the voltage level and wherein each of said input and output devices monitors its voltage monitor and establishes voltage level information, said voltage level information being communicated between said input devices and said master interfaces through said primary link and between said master interface and said server, and wherein said server creates a graphical representation of the location of said input and output devices by using said voltage level information.

15. The lighting control system of claim 1 wherein each of said master interface, input device and said output device are identified in the control system with a unique address, said unique addresses being established and maintained by said server and wherein said unique addresses are communicated between said server and said master interface and between said master interface and said input and output devices through said primary link.

16. The lighting control system of claim 15 wherein said unique addresses are linked to a virtual graphical representation at said server, and said virtual graphical representations are displayed on a monitor connected to said server.

17. The lighting control system of claim 15 wherein said master interface includes a power source connected to and providing power to each of said input device and output device through said primary link in a daisy chain, wherein each of said input device and output device include a voltage monitor capable of monitoring the voltage level and wherein each of said input and output devices monitors its voltage monitor and establishes voltage level information, said voltage level information being communicated between said input devices and said master interfaces through said primary link and between said master interface and said server, and wherein said server creates a graphical representation of the location of said input and output devices by using said voltage level information and said unique addresses of said input and output devices.

18. The lighting control system of claim 1 wherein said connection and communication between said master interface and said server is via an Ethernet TCP/IP protocols.

19. The lighting control system of claim 1 wherein said primary link connection and communication between said master interface and said input output devices is via an RS-485 multi drop addressable protocol.

20. The lighting control system of claim 1 wherein said master interface includes an Ethernet microcontroller and a master microcontroller connected and communicating with each other through a dedicated serial communication link, said Ethernet microcontroller being connected to and communicating with said server through an Ethernet TCP/IP protocol link and said master microcontroller being connected to and communicating with said input and output devices through said primary communication link.

* * * * *